United States Patent
Rubio

(10) Patent No.: US 9,938,958 B2
(45) Date of Patent: Apr. 10, 2018

(54) VERTICAL AXIS WIND AND HYDRAULIC TURBINE WITH FLOW CONTROL

(71) Applicant: Humberto Antonio Rubio, Ciudad Autónoma de Buenos Aires (AR)

(72) Inventor: Humberto Antonio Rubio, Ciudad Autónoma de Buenos Aires (AR)

( * ) Notice: Subject to any disclaimer, the term of this patent is extended or adjusted under 35 U.S.C. 154(b) by 1335 days.

(21) Appl. No.: 13/736,325

(22) Filed: Jan. 8, 2013

(65) Prior Publication Data

US 2014/0023500 A1    Jan. 23, 2014

(30) Foreign Application Priority Data

Jul. 19, 2012   (AR) ................................ P120102619
Oct. 15, 2012   (AR) ................................ P120103837

(51) Int. Cl.
*F03D 3/04*       (2006.01)
*F03D 3/06*       (2006.01)
(Continued)

(52) U.S. Cl.
CPC .............. *F03D 3/005* (2013.01); *F03B 3/183* (2013.01); *F03B 17/062* (2013.01); *F03D 3/0409* (2013.01); *F03D 3/0418* (2013.01); *F05B 2210/16* (2013.01); *F05B 2240/12* (2013.01); *F05B 2240/9151* (2013.01);
(Continued)

(58) Field of Classification Search
CPC ...... F03D 3/0418; F03D 3/005; F03D 3/0409; F03B 3/183; F03B 17/062; Y02E 10/28; Y02E 10/728; Y02E 10/74; Y02E 10/223; Y02E 10/226; F05B 2270/101;
(Continued)

(56) References Cited

U.S. PATENT DOCUMENTS 204,481 A * 6/1878 Cleland .................. F03B 3/145
                                                          415/164
3,986,787 A   10/1976 Moutonk, Jr. et al.
(Continued)

FOREIGN PATENT DOCUMENTS

ES    2020711    9/1991
ES    2149638    11/2000
(Continued)

OTHER PUBLICATIONS

Korean Office Action dated Mar. 8, 2016 in corresponding Korean Patent Application No. 10-2015-7001980 with English translation of Korean Office Action.
(Continued)

*Primary Examiner* — Christopher Verdier
(74) *Attorney, Agent, or Firm* — Young & Thompson

(57) ABSTRACT

A vertical axis wind and hydraulic turbine with flow control including a regular hexagonal structure of radius R, parallelepiped-shaped, inside which a rotor rotates with three or more vanes on a vertical axis which is located in the center of the hexagon as seen from above, wherein the vanes when rotating generate a circle of radius Rt, further including six articulated deflector vanes that grab and concentrate the flow of air or liquid entering the rotor vanes, from the wind or liquid current entry side to the turbine and diffuse the flow of air or liquid exiting from the rotor vanes, from the side opposite to the wind or liquid entry side to the turbine.

22 Claims, 16 Drawing Sheets

(51) Int. Cl.
  *F03D 7/02* (2006.01)
  *F03B 3/12* (2006.01)
  *F03B 3/18* (2006.01)
  *F03B 17/06* (2006.01)
  *F03D 3/00* (2006.01)

(52) U.S. Cl.
  CPC ............... *F05B 2240/91521* (2013.01); *F05B 2250/132* (2013.01); *F05B 2250/22* (2013.01); *F05B 2270/101* (2013.01); *Y02E 10/223* (2013.01); *Y02E 10/28* (2013.01); *Y02E 10/728* (2013.01); *Y02E 10/74* (2013.01)

(58) Field of Classification Search
  CPC ............ F05B 2250/132; F05B 2250/22; F05B 2240/12; F05B 2210/16
  USPC ........ 415/2.1, 4.2, 4.4, 53.1, 53.3, 905, 906, 415/907
  See application file for complete search history.

(56) References Cited

U.S. PATENT DOCUMENTS

| | | | |
|---|---|---|---|
| 4,104,536 A | 8/1978 | Gutsfeld | |
| 4,205,943 A | 6/1980 | Vauthier | |
| 4,236,866 A | 12/1980 | Zapata Martinez | |
| 4,468,169 A | 8/1984 | Williams | |
| 5,503,530 A * | 4/1996 | Walters | F03D 3/0409 415/907 |
| 5,664,418 A | 9/1997 | Walters | |
| 6,824,349 B2 | 11/2004 | Okudera et al. | |
| 7,083,382 B2 | 8/2006 | Ursua | |
| 7,105,942 B2 | 9/2006 | Henriksen | |
| 7,471,009 B2 | 12/2008 | Davis et al. | |
| 8,192,138 B2 | 6/2012 | Kelaiditis | |
| 8,210,805 B1 | 7/2012 | Osborne | |
| 2008/0007067 A1 | 1/2008 | Ryu et al. | |
| 2009/0289459 A1* | 11/2009 | Chung | F03D 3/0427 290/55 |
| 2010/0254799 A1* | 10/2010 | Caines | F03D 3/0418 415/36 |
| 2012/0107085 A1 | 5/2012 | McCowan et al. | |

FOREIGN PATENT DOCUMENTS

| | | |
|---|---|---|
| ES | 2161650 | 12/2001 |
| ES | 2310965 | 1/2009 |
| GB | 2485574 | 5/2012 |
| GB | 2486697 | 6/2012 |
| GB | 2486911 | 7/2012 |
| JP | 2000-161196 | 6/2000 |
| JP | 2001-3708 | 1/2001 |
| JP | 2001-193633 | 7/2001 |
| JP | 2002-322975 | 11/2002 |
| JP | 2002-364517 | 12/2002 |
| JP | 200444477 | 2/2004 |
| JP | 2004-301088 | 10/2004 |
| JP | 2005333744 | 12/2005 |
| JP | 2012-57483 | 3/2012 |
| KR | 10-2011-0122971 | 11/2011 |
| KR | 20110136262 | 12/2011 |
| RU | 69579 | 12/2007 |
| WO | 2006097091 | 9/2006 |
| WO | 2011160688 | 12/2011 |

OTHER PUBLICATIONS

International Search Report dated Nov. 11, 2013 in International Application No. PCT/IB2013-055839.

* cited by examiner

FIGURE 2´
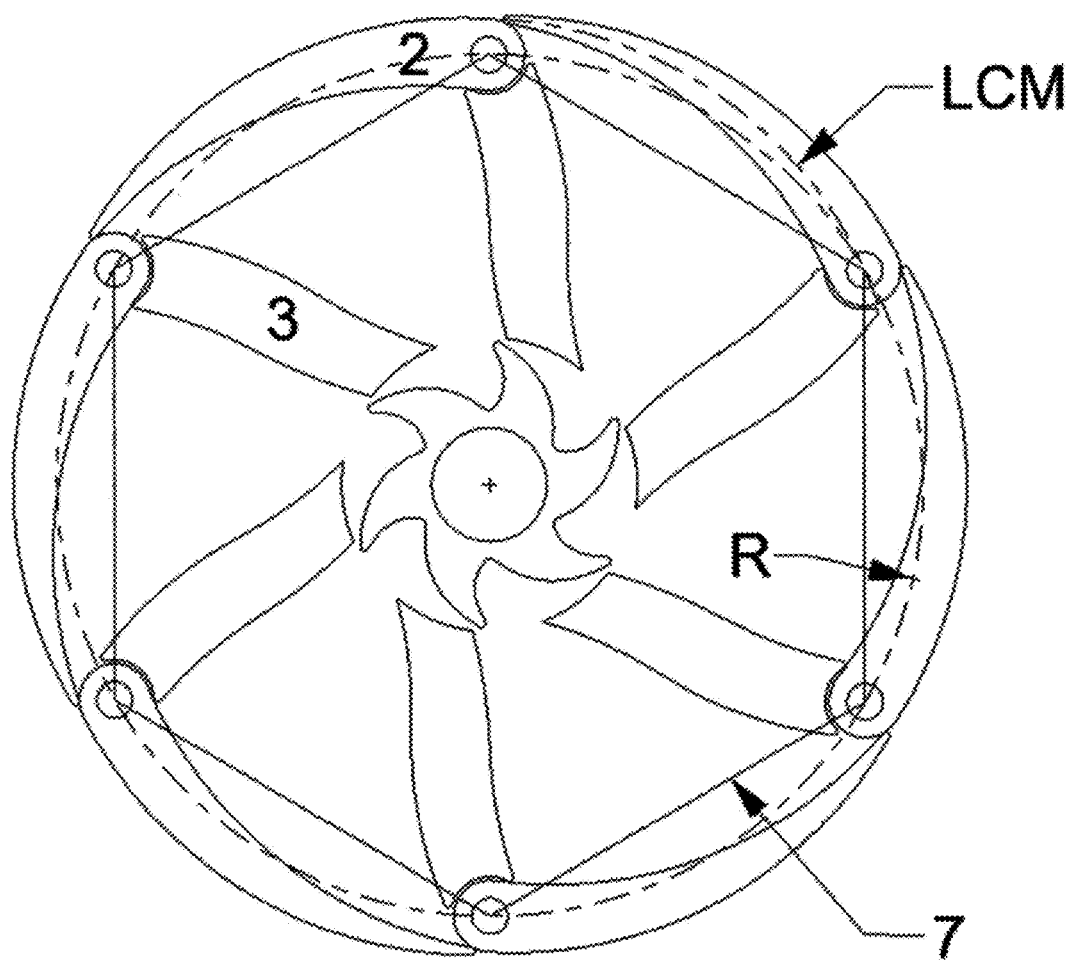

FIGURE 5´
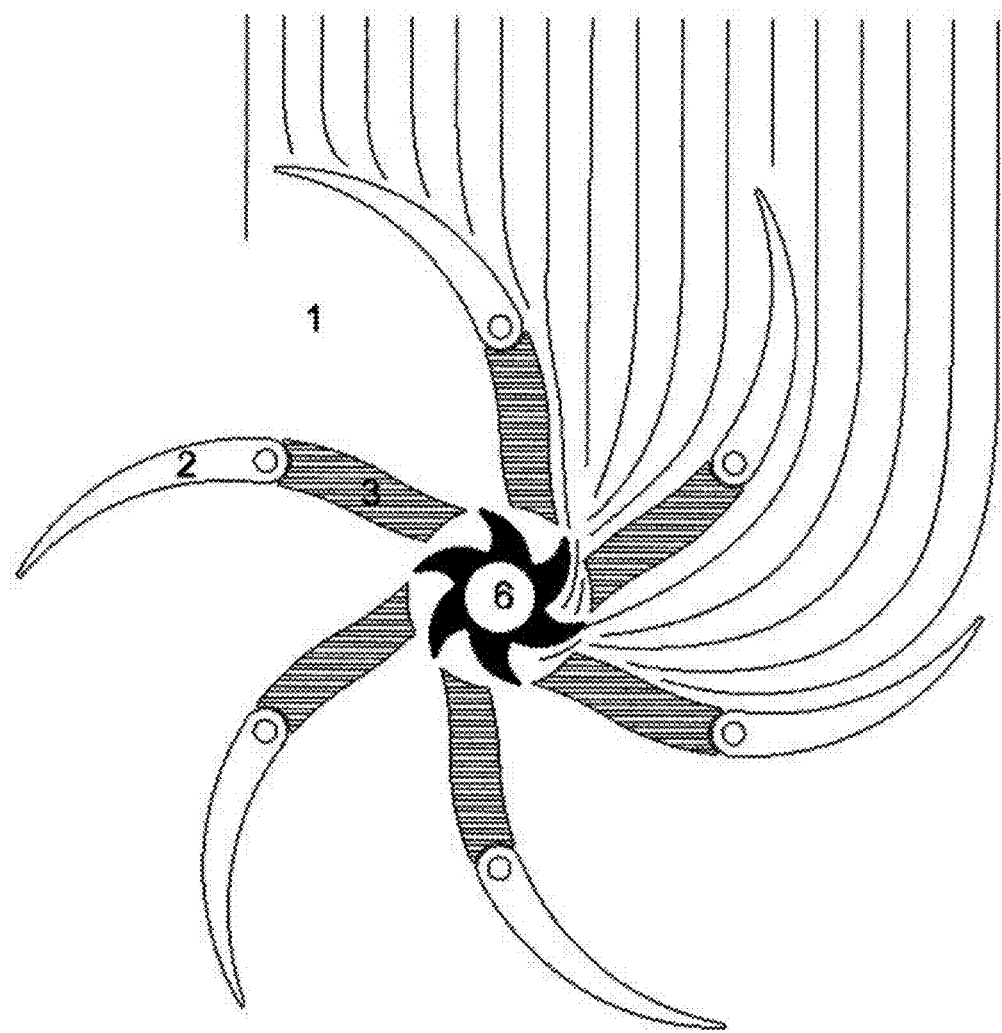

FIGURE 10´
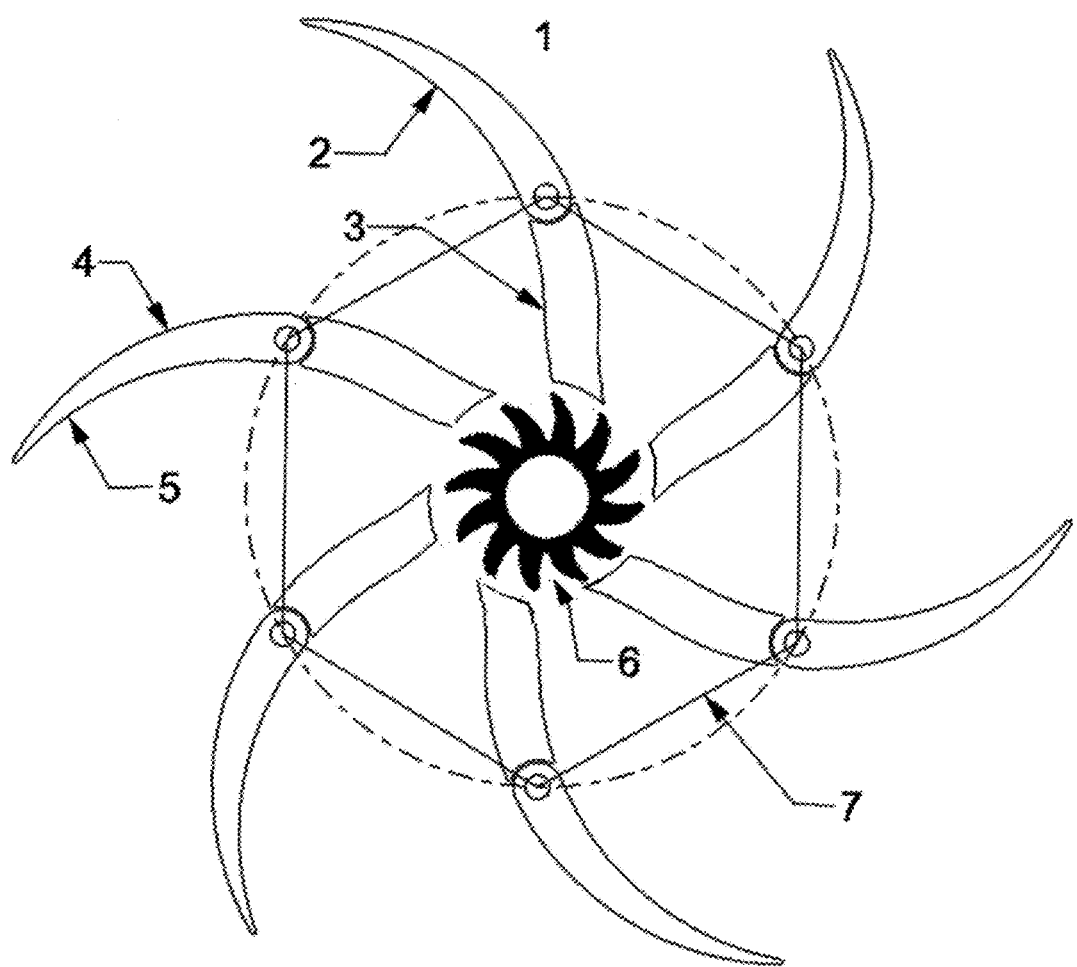

VERTICAL AXIS WIND AND HYDRAULIC TURBINE WITH FLOW CONTROL

OBJECT OF THE INVENTION

The invention concerns a vertical axis wind and hydraulic turbine with air or water flow control according to the operation environment.

When the vertical axis wind and hydraulic turbine with flow control works in wind, the air flow control is achieved through the use of articulated deflector vanes with dimensions associated to the rotor vane width. Each articulated deflector vane comprises a moveable deflector part and a fixed deflector part forming the moveable deflecting vane and the fixed deflecting vane respectively.

It basically consists of six sets of moveable deflecting vanes each associated with a fixed deflector performing different roles in the dynamics of the fluid (air).

The moveable deflector is shaped such that it captures a moving air mass greater than that the rotor would capture without said vanes and the fixed deflector concentrates and directs the fluid directly on the rotor vanes faster than the external wind speed.

The rotor operates on resistance force; the vertical axis wind turbine with air flow control has considerable advantages over the traditional vertical axis turbines by operating on resistance force and high speed.

When the vertical axis wind and hydraulic turbine with flow control operates hydraulically, flow control may be achieved through the use of articulated deflector vanes dimensions associated to the width of the rotor vane. Each articulated deflector vane comprises a moveable deflecting part and a fixed deflecting part forming the moveable deflecting vane and the fixed deflecting vane respectively.

It basically consists of six sets of moving deflecting vanes each associated with a fixed deflector performing different functions in the fluid dynamics (in this case liquids such as water).

The moveable deflector is shaped such that it captures a moving fluid mass greater than that the rotor would capture without said vanes and the fixed deflector concentrates and directs the fluid directly on the rotor vanes faster than the external fluid speed wherein the turbine is hydraulically installed.

The rotor operates on resistance force; the vertical axis turbine with flow control in hydraulic mode has considerable advantages over the traditional vertical axis turbine systems by operating on resistance force.

BACKGROUND OF THE INVENTION

About Wind Turbines:

Savonius rotors are a type of vertical axis wind turbine used to convert wind power into torque on a rotating shaft. They were invented by the Finnish engineer Sigurd J. Savonius in 1922.

Savonius turbines are one of the simplest turbines. Aerodynamically, they are drag or resistance devices comprising two or three vanes. Looking at the rotor from the top, the vanes form the shape of an S. Because of the curvature, the vanes experience less resistance when moving against the wind in its direction. This difference causes the Savonius turbine to rotate. As a drag device, the Savonius draws much less of the force of the wind than similar sized lift turbines. On the other hand, there is no need to position the turbines in the direction of the wind, they better support turbulence and are able to start rotating in low speed winds. It is one of the cheapest and easiest to use turbine.

Savonius turbines are used where the cost is more important than efficiency. For example, most anemometers are Savonius turbines (or a derivative design) because the efficiency is completely irrelevant to that application. Much larger Savonius turbines have been used to generate electricity in deep water buoys, which need small amounts of power and require very little maintenance. The most common application of the Savonius turbine is the Flettner ventilator which is commonly seen on the roofs of vans and buses used as a cooling device. The fan was created by German engineer Anton Flettner. Today, the Savonius turbine is increasingly used to power small appliances.

The Darrieus wind turbine is a type of vertical axis wind turbine that is used to generate electricity from the energy carried by the wind. The turbine comprises a number of lift surfaces usually, but not always, vertically mounted on a rotating shaft or frame. This design of wind turbine was patented by Georges Jean Marie Darrieus, a French engineer in 1931.

The traditional differential systems Savonius and Darrieus generate turbulence and varying tensions on the rotor ending in parasitic forces and vibrations that limit performance and system control.

U.S. Pat. No. 6,824,349 relates to a rotor operating at low wind speeds, which comprises a base, a rotor frame rotationally supported on the base for moving about a vertical axis clockwise, and a plurality of vane type screens to receive the wind pivotally arranged on the rotor frame for moving about a vertical axis clockwise between a first closed position and a second open position, the main differences between the object of the present invention and the object of U.S. Pat. No. 6,824,349 is that the latter is a direct action apparatus without airflow enhancer; it also includes moving parts in the rotor that reduce speed and performance, it is a complex mechanism exposed to erosion and wear with lubrication issues. In addition the system is noisy and slow contributing not much to the overall performance.

U.S. Pat. No. 4,468,169 relates to a wind turbine with high torque regulated flexible vanes, that consists of a horizontally mounted wind wheel which comprises a frame mounted for rotation in a horizontal plane about a central axis perpendicular, a plurality of secondary axes supported for rotation on said frame near the periphery thereof, a vane mounted near one end thereof of each secondary axis, a plurality of vane stops on the frame radially arranged inwardly from axes to limit the rotation of the vanes, each one of said secondary shafts being mounted for rotation near an axis which is inclined with respect to the vertical of said horizontal plane as a result of which each vane has a preferred, predetermined rest position defined by the direction of slope of each axis from a vertical line; the main differences between the object of the present invention and the object of U.S. Pat. No. 4,468,169 are that the latter also refers to a direct action apparatus without airflow enhancer, it also includes moving parts in the rotor that reduce speed and performance, it is a complex mechanism exposed to erosion and wear with lubrication issues, and this system is noisy and slow showing a poor overall performance.

U.S. Pat. No. 7,083,382 relates to a vertical axis wind turbine, said invention provides a primary motor to use the energy of a fluid flow, the primary motor comprises a shaft having a rotational axis, arranged to be rotatably mounted to a substructure, the shaft comprising at least one arm extending radially from said shaft, the arm or each arm comprising at least one vane being the vane or each vane positioned so that the action of flow on the vane affects the rotation axis, wherein the vane or each vane is movably mounted on an arm and wherein each vane is movable from a first position, providing a first drag, to a second position which provides a second drag, wherein the first drag is higher than the second.

The primary motor drive above provides a substantially reduced drag on a fluid flow, and an increased torque output, compared with the engines or main turbines of the prior art, but the main differences in relation with the object of the present invention is that the wind turbine of U.S. Pat. No. 7,083,382 is a direct action apparatus without airflow enhancer with many moving parts that reduce speed and performance, it has a complex mechanism exposed to wear by erosion and lubrication issues resulting in a noisy and slow equipment showing a poor overall performance.

The publication of Spanish application 2,161,650 relates to a system to use the wind energy that comprises a windmill having a vertical axis which project a plurality of radial arms, the arms of each pair opposing to each other, and at the end of each of these arms, mounted on a hinge, there is a rectangular vane vertically arranged in a plane perpendicular to the respective radial arm on which it is articulated. The opposite vanes of a pair stay at rest, positioned perpendicularly to the wind direction making this to carry the thrust and tilting of this pair of vanes, limiting the variation angle of these vanes by means of a stop. Each of the vanes is associated to a recovery element that positions said upper arm said vane perpendicular to the arm hinged to when the thrust ceases; the main differences between the present invention and the object of the Spanish publication 2,161, 650 are that the latter does not have an enhancer or flow concentrator, it has moving parts in the rotor, it has a direct-acting mechanism with rotor adjustment that activates on each turn, which is not practical in snowy areas due to the energy loss, it is not allowed a complete closure in case of extreme winds, it has lubrication issues, noise, poor performance, wear, low speed, it is impossible to regulate the speed, it is impossible to completely stop it for repairs, and provides a low final velocity.

The Spanish application publication corresponding to ES 2,020,711 relates to a rotating shaft for wind turbines which comprises a fixed tower, to be installed on the ground, establishing a major axis vertically, wherein on its upper end and above the tower a plurality of radial and horizontal arms are fixed jointly, with an equiangular distribution, each of which carries one or more plates or vanes which form the receiving means of the action of the wind, with the particularity that said vanes are attached articulated to said arms with the assistance of vertical hinge axes and are susceptible to adapt to such arms, with the assistance of an armor, during the half cycle wherein said operating arm is getting the wind, and to adopt a arrangement parallel to said wind direction during the inoperative half cycle, the return of said arm against the wind direction, the main differences between the present invention and the object of the Spanish publication 2,020,711 are that the latter has a direct action mechanism with rotor adjustment and moving parts that activates on every turn, there evidences loss of energy and is not practical in snowy areas, does not allow a complete closure in the event of extreme winds, it also has lubrication issues, noise, wear, poor performance, it is also impossible to regulate the speed and stop it completely to fix it, and finally the rotating shaft for wind turbines has a low final speed according to its configuration.

Spanish publication ES 2,310,965 relates to a wind or hydraulic turbine comprising multiple thin vertical wall nozzles, which form the fixed structure of the turbine.

Within this structure there is a runner, of vertical axis, provided with vanes, hinged to arms firmly anchored to the runner, which can adopt intermediate positions between the maximum and minimum opening, depending on the speed of the incoming streams. The gradual opening of the vanes to completely use the corresponding energies is automatically achieved by tensioning devices such as that consisting of a winding drum and a cable, being the ends thereof fixed to its vane and drum, fixed to the runner. The radial turbine is completed with a cover, which rests on a plate or bracing beams of the walls of the nozzles, said turbine may be applied to capture the kinetic energy of the air or water in motion, the main differences between the present invention and the object of the Spanish publication 2310965 are that this design has no flow enhancer and comprises movable structures in the rotor which generate noise, wear, lubrication issues and exposure to abrasive agents, said device provides a poor overall performance to the system and much complication in relation with maintenance as it is a moveable device that activates with each rotation; its structure determines much energy loss resulting unpractical at snowy areas, it also does not allow a complete closure in case of extreme winds either.

The Spanish publication ES 2,149,638 relates to a vertical axis apparatus for capturing, concentrating, directing and using the energy of fluids in motion, a section configured by a plane perpendicular to the rotor axis thereof shows an external zone, of fixed radial vertical surfaces that captures the fluid taking it to an intermediate zone, of fixed oblique vertical surfaces, deviating the same to the inner zone where vertical axis rotor is located that will rotate in the direction of impact of the fluid; the design of said apparatus constitutes a versatile system as it is able to use the wind or moving water to rotate the rotor; the rotor rotation can be used for producing electricity or mechanical energy useful for appropriate use, the main differences between the present invention and the object of the Spanish publication 2149638 are that this design consists of fixed structures not related to the system itself, it does not comprise a generator as it consists of isolated parts without structural relationship between them, it has no flow enhancement mechanism, it does not allow a complete closure for repairs and in case of extreme wind the rotor is exposed, it is not easily manufactured and needs a lot of installation space; its shape does not allow installation in buildings or small places as platform boats, or the use as a portable device.

The US Publication 2008/0007067 relates to a wind turbine and is the closest prior art to the object of the present invention, said wind turbine includes a support unit having a lower base block and a protruding cylindrical portion, a rotary cylinder is rotatably supported by the projecting part, a rotating shaft extending from a center of the rotary cylinder to rotate in the same direction, an upper bearing installed in the projection to support the rotating cylinder, a lower bearing block is installed on the lower base for supporting the rotary cylinder, a plurality of vanes are installed along the outer circumference of the rotary cylinder at regular angular intervals, and opens outwards in relation with the rotary cylinder or closes to be in intimate contact with the outer circumference of the rotary cylinder, according to a position relative to a wind direction, an angle limiting means prevents each vane is opened beyond a predetermined angle, the main differences between the present invention and the object of US Publication 2008/0007067 are that the latter has no air flow enhancer and therefore a poor air capture performance is achievable, the system is also exposed to extreme winds.

About Hydraulic Turbines:

The generation of renewable energy from natural sources is a field of substantial interest and much development in recent years. Among the forms of energy available to vertical hydraulic turbines are wave energy and current power.

Wave energy is obtained exploiting the tides, by connecting an alternator the system can be used to generate electricity, thereby transforming wave energy into electrical energy, a more secure and usable form of energy. It is a type of renewable energy, as the primary energy source is not exhausted by use, and it is clean as in energy transformation no solid, liquid or gaseous polluting byproducts occur. However, the relationship between the amount of energy that can be obtained with today's means and the economic and environmental cost of installing the devices for processing have prevented significant penetration of this type of energy.

The current power involves using the kinetic energy contained in water currents. The capture process is based on kinetic energy converters similar to wind turbines in this case using subsea installations.

A hydraulic turbine is a turbo hydraulic machine that uses the energy of a fluid passing through it to produce a rotation movement, that transferred by a shaft, directly drives a machine or a generator which converts mechanical energy into power, and in this way it is a key organ of a hydroelectric plant.

Among the known hydraulic turbines is the Pelton turbine, one of the most efficient hydraulic turbines. It is a turbo, cross flow, partial intake, and action machine. It consists of a wheel (runner or rotor) provided with spoons on its periphery, which are specially made to convert the energy of a water jet impinging on the spoons.

Pelton turbines are designed to exploit large low flow hydraulic jumps. Hydroelectric plants equipped with this type of turbine have, most of the time, with a long piping called pressure gallery to transport the fluid from great heights, sometimes to more than two hundred meters. At the end of the pressure gallery water is supplied to the turbine through one or more needle valves, also called injectors, which have the form of a nozzle to increase flow velocity impinging spoons. Pelton turbines have the disadvantage of requiring large height differences (hydraulic jumps) for converting hydraulic energy into electrical energy and lack of fluid flow control.

The Francis turbine was developed by James B. Francis. This is a reaction and mixed flow turbo machine.

Francis turbines are turbines that can be designed for a wide range of jumps and flows, being able to operate in ranges of altitude ranging from six meters to several hundred meters. This, together with its high efficiency, has made this type of turbine the most widely used in the world, mainly for generating electricity by hydroelectric plants. Francis turbines lack of fluid flow control.

The Turgo turbine is an impulse water turbine designed for medium gradient jumps. It was developed by the company Gilkes in 1919 from a Pelton turbine modification.

The Turgo turbine is an impulse type turbine. The water pressure does not change as it passes through the turbine vanes. The water's potential energy is converted into kinetic energy at the inlet nozzle or injector. The water jet is directed at high velocity against the turbine vanes to deflect and reverse the flow. The resulting impulse rotates the runner turbine, communicating the energy to the axis of the turbine. Finally the water comes out with very little energy. The Turgo turbine runners may have a performance over 90%.

The runner of a Turgo looks like a Pelton runner split in half. For the same power, the Turgo runner diameter is half that of a Pelton runner and doubles the specific speed. The Turgo runner can handle a greater flow of water because than Pelton as the water coming out does not interfere with adjacent vanes.

The specific speed of Turgo runners is from the speed of Francis and Pelton turbines. One or more nozzles or injectors can be used. Increasing the number of injectors increases the specific speed of the runner in the square root of the number of jets (four jets yield twice the specific speed of a jet for the same turbine). The Turgo turbine has no fluid flow control.

The Spanish Publication ES 2310965 cited above relates to a wind or hydraulic turbine comprising multiple vertical thin wall nozzles, which form the fixed structure of the turbine.

Within this structure there is a runner, of vertical axis, provided with vanes, articulated to arms fixedly anchored to the runner, which can adopt intermediate positions between the maximum and minimum opening, depending on the speed of the incoming streams. The gradual opening of the vanes to maximize the use of the corresponding energies is automatically achieved by tensioning devices such as that composed of a winding drum and cable, being the ends thereof fixed to its vane and drum, fixed to the runner. The radial turbine is completed with a cover, which rests on a plate or bracing beams in the walls of the nozzles, said turbine may be applied to capture the kinetic energy of the air or water in motion, the main differences between the present invention and the object of the Spanish publication 2310965 are that this design has no flow enhancer and comprises movable structures in the rotor which generate vibration, wear, lubrication issues; said device provides a poor overall performance to the system and much complication in relation with maintenance as it is a moveable device that activates with each rotation; its structure determines much energy loss, it also does not allow a complete closure in case maintenance shutdown either.

The Spanish Publication ES 2149638 cited above refers to a relates to a vertical axis apparatus for capturing, concentrating, directing and use the energy of fluids in motion, a section configured by a plane perpendicular to the rotor axis thereof shows an external zone, of fixed radial vertical surfaces that captures the fluid taking it to an intermediate zone, of fixed oblique vertical surfaces, deviating the same to the inner zone where vertical axis rotor is located that will rotate in the direction of impact of the fluid; the design of said apparatus constitutes a versatile system as it is able to use the wind or moving water to rotate the rotor; the rotor rotation can be used for producing electricity or mechanical energy useful for appropriate use, the main differences between the present invention and the object of the Spanish publication 2149638 are that this design consists of fixed structures not related to system itself, it does not comprise a generator as it consists of isolated parts without structural relationship between them, it has no flow enhancement mechanism, it does not allow a complete closure for repairs and in case of extreme wind the rotor is exposed, it is not easily manufactured and needs a lot of installation space; its shape does not allow installation in buildings or small places as platform boats, or the use as a portable device.

The patent application publication GB 2485574 relates to a vertical axis water turbine mounted inside a vertical tower, which can be mounted on the seabed or river, the rotor has a direct action without water flux concentrator, the rotor is a low performance device as the tangential speed to the same is equal to the flow velocity, turbulences appear in the central zone of the rotor with energy loss, a countercurrent could be generated in a significant portion of the rotor rotation with opposite direction flows and blocking of the capture inlets of the tower. The anchoring system operates at a predetermined depth, which makes it impossible to vary in depth changes of flow in water, the anchor is unidirectional or allows the water flow only in one-way.

The patent application publication GB 2,486,697 relates to a power generation equipment such as a turbine for generation of electricity from wave and river flows comprising a support structure on the river bed or body, a floating energy generator and a crankshaft to move a belt, this power generator has a direct system without enhancer with insulation problems difficult to solve, with no automatic routing and high operational costs, having costly transmission lines with risk of breakage and accidents.

The patent application publication GB 2,486,911 relates to a method and apparatus for generating energy from a flowing stream of water, the system comprising mounting the generator supported by a mooring by retaining means such as between the bed of the ocean and the surface water; the generator assembly may rotate through its vertical axis and represents a direct action system without enhancer, with low range flow orientation which creates vortices and turbulence that reduce the efficiency of the set of engines which opposite circulation generates parasitic crosscurrents. The generator is located under the level of water presenting problems of isolation and transmission, only operating with fluids at high speed, wherein the tangential speed of the rotor is similar to liquid flow speed.

U.S. Pat. No. 3,986,787 relates to a turbine for rivers which is wheel turbine on a horizontal shaft mounted coaxially within a primary nozzle, to be supported in a river stream under a platform that carries the equipment of electric power generation. The turbine shaft and the primary nozzle is submerged and positioned to allow a portion of the flow of the river stream through the nozzle and through the turbine wheel. This turbine is a differential force operating mechanism and accelerates the output flow by narrowing the major nozzle; the system is complicated and maintenance costly, and is exposed to cavitation due to sediment dragging. No improvement regarding performance or increase the flow received by the propeller, substantially, it is a rotor system inefficient and fragile wherein operation depth cannot be adjusted. The system is difficult to anchor and direct and it is only suitable for one-way currents.

U.S. Pat. No. 4,104,536 relates to a power turbine for a stream or river comprising an elongated cylinder with radially extending vanes, each vane has on its supports a plurality of axially spaced fins valves that open and close the corresponding openings thereof. These valves open automatically son that the vanes enter the tail of the wave or release pressure thereon. It is a horizontal axis, direct action system without flow enhancer having movable vanes, subjected to great wear besides being noisy that provides no performance benefits as it locates out of the water surface and the attained height is minimum. It has a power generator exposed to moisture hard to access for repairs.

U.S. Pat. No. 4,205,943 relates to a hydroelectric generator wherein its efficiency is enhanced by the provision of open end tower tubes having inflow ends close the axis and outflow ends close to the periphery of a vane fan turbine. The water jets produced by the vane fan turbine are directed against the turbine vanes at the periphery of the fan vanes. The device is particularly suitable for mounting on watercourses such as rivers and oceans. This is a complex and low performance system due to the loss of energy by raising the water column by direct action without a water flux concentrator. It is difficult to position and unstable.

U.S. Pat. No. 4,236,866 relates to a system for obtaining and regulating air or sea or river current power including a cyclone converter comprised by three concentric rotating bodies, any of them on vanes or cylindrical rails. Fixed by rollers or other electromagnetic system allows rotation of the group around an imaginary or real geometric axis, it is a low performance system as it is a direct action device, it evidences a flow turbulence as it operates in a dense medium like water, power is lost by increasing the volume of the water column in the center of the equipment. This is a system that has insulation and maintenance difficulties if used in water.

U.S. Pat. No. 7,105,942 relates to a power plant with a rotating member for generating current power in a body of water, comprising a fixedly mounted floating structure, and a plurality of replaceable generator units supported by the structure which are controlled by water currents. This is a differential action system using propellers of variable curvature; the generator is under the water surface with risk of moisture and filtrations; it has a variable propeller exposed to erosion, it represents an expensive and fragile mechanism that is not self positionable.

U.S. Pat. No. 7,471,009 relates to an apparatus which is disclosed as a turbine to generate electric power from a fluid of water or air comprising at least one disk rotor having a plurality of vanes in "hydrofoil", position vanes, a cylindrical housing and generating means. It represents a differential action system with the generator included at the end of the rotor vanes, its use as a hydraulic turbine is costly and shows a poor performance, it is difficult to isolate and in case of repair it is necessary to move the entire system. Anchoring is complicated and unstable in a watercourse; it has an electric mechanism exposed to currents.

U.S. Pat. No. 8,210,805 relates to a turbine having a runner mounted on a shaft. The runner has a central cylindrical wheel mounted on the shaft, and a plurality of vanes extending radially from the wheel center. The vanes are welded to the wheel center with end plates on each end of the runner. Watertight chambers are formed for receiving water by adjacent vanes, the wheel center and the end plates. An inlet directs water into the runner to rotate it. The vanes have a curved shape with no part of the vane extending below the highest part of the inlet when the other edge of the vane is aligned with the top of the inlet. This system represents a horizontal axis turbine which can be used only on the water surface; it is not suitable for deep sea currents, anchoring is difficult, positioning is cumbersome, it is costly and not automatic.

BRIEF DESCRIPTION OF THE DRAWINGS

The vertical axis wind and hydraulic turbine with flow control herein can operate in wind or hydraulic mode with flow control.

When the present turbine operates in wind mode, it is represented by the following FIGS. 1-12 and hereinafter it will be referred as "vertical axis wind turbine with flow control".

Figure 1:
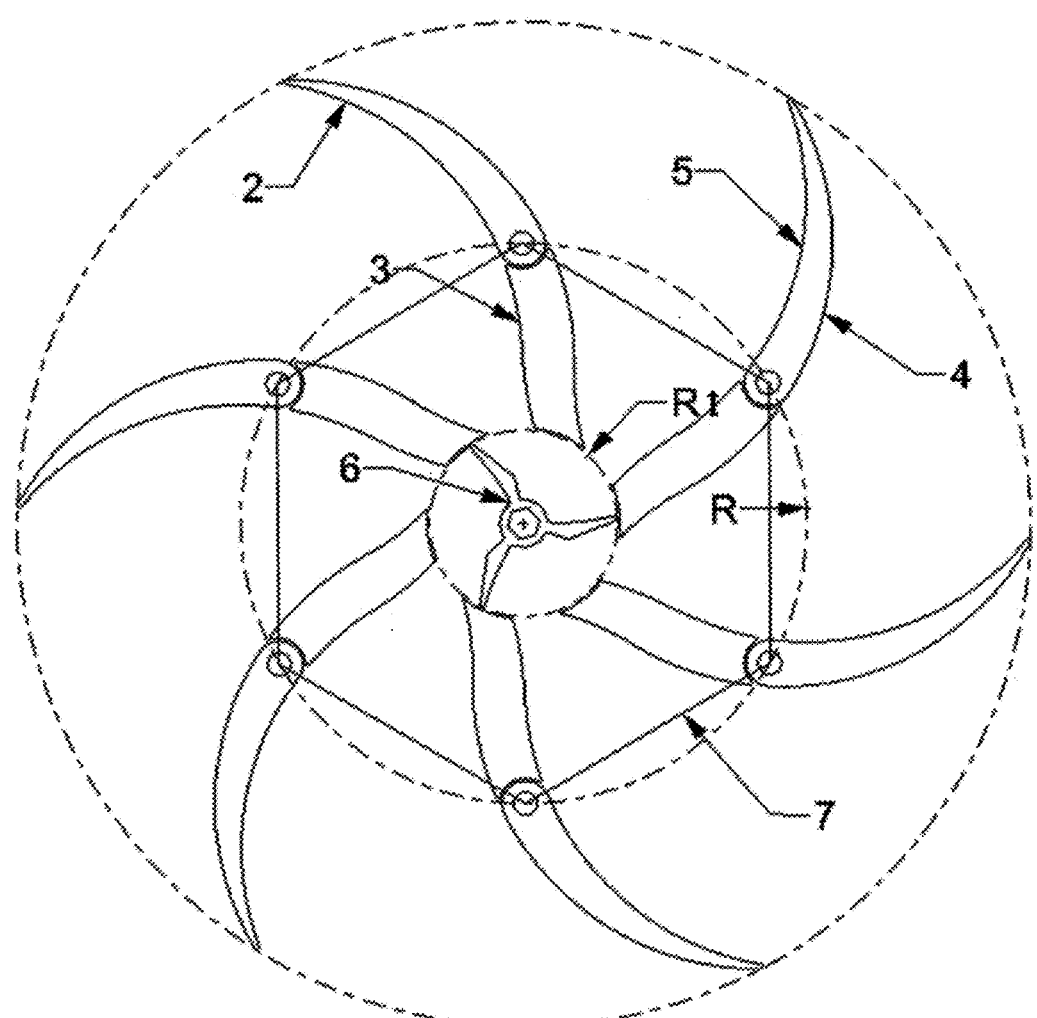
FIG. 1 shows a top view of the vertical axis wind turbine with air flow control wherein articulated deflector vanes are shown open, with the movable part (2) and the fixed part (3), the zones corresponding to the upper (4) and lower surface (5) of the movable part, the rotor (6), the hexagonal structure (7), the rotor radius (Rt) taken from the center of the hexagon (8) and the corresponding radius of the hexagon (R). Also see FIG. 1' showing the articulated deflector vanes (1) open.
Figure 1:
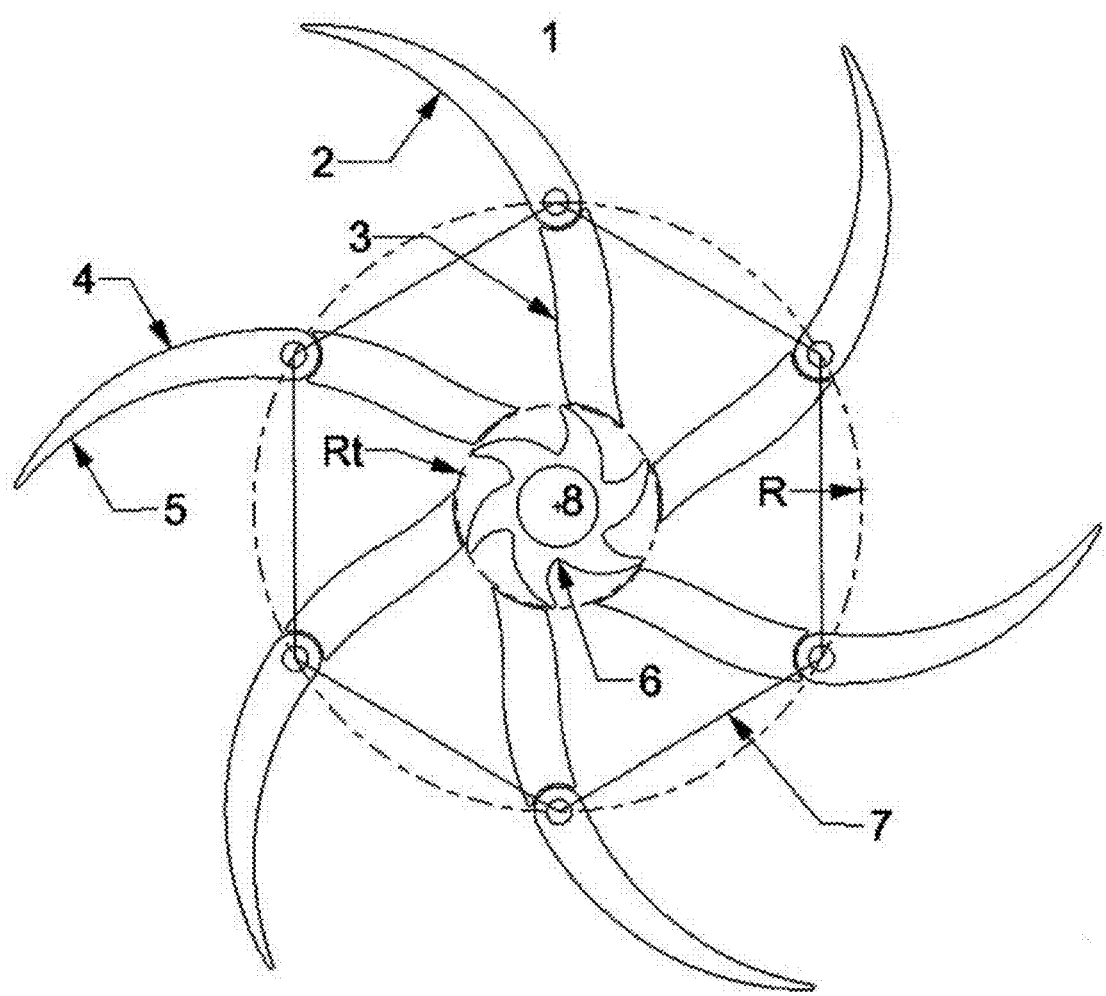

When the wind and hydraulic turbine with flow control of this invention operates in hydraulic mode, it is represented by the following FIGS. 1', 2', 3, 4, 5', 6 to 9 and 10' (this modification of the turbine in hydraulic mode shares FIGS. 3, 4, 6, 7, 8 and 9 with the wind mode) and hereinafter it will be referred as "vertical axis hydraulic turbine with flow control":

FIG. 1': shows a top view of the vertical axis hydraulic turbine with liquid flow control wherein articulated deflector vanes (1) are shown open, with the moveable part (2) and the fixed part (3), the areas corresponding to the upper (4) and lower surface (5) of the movable part, the rotor (6) of 6 vanes which is hollow, the hexagonal structure (7), the rotor radius (Rt) taken from the center of hexagon (8) and the corresponding hexagon radius (R). The rotor vanes are of a shark fin type.

Figure 2:
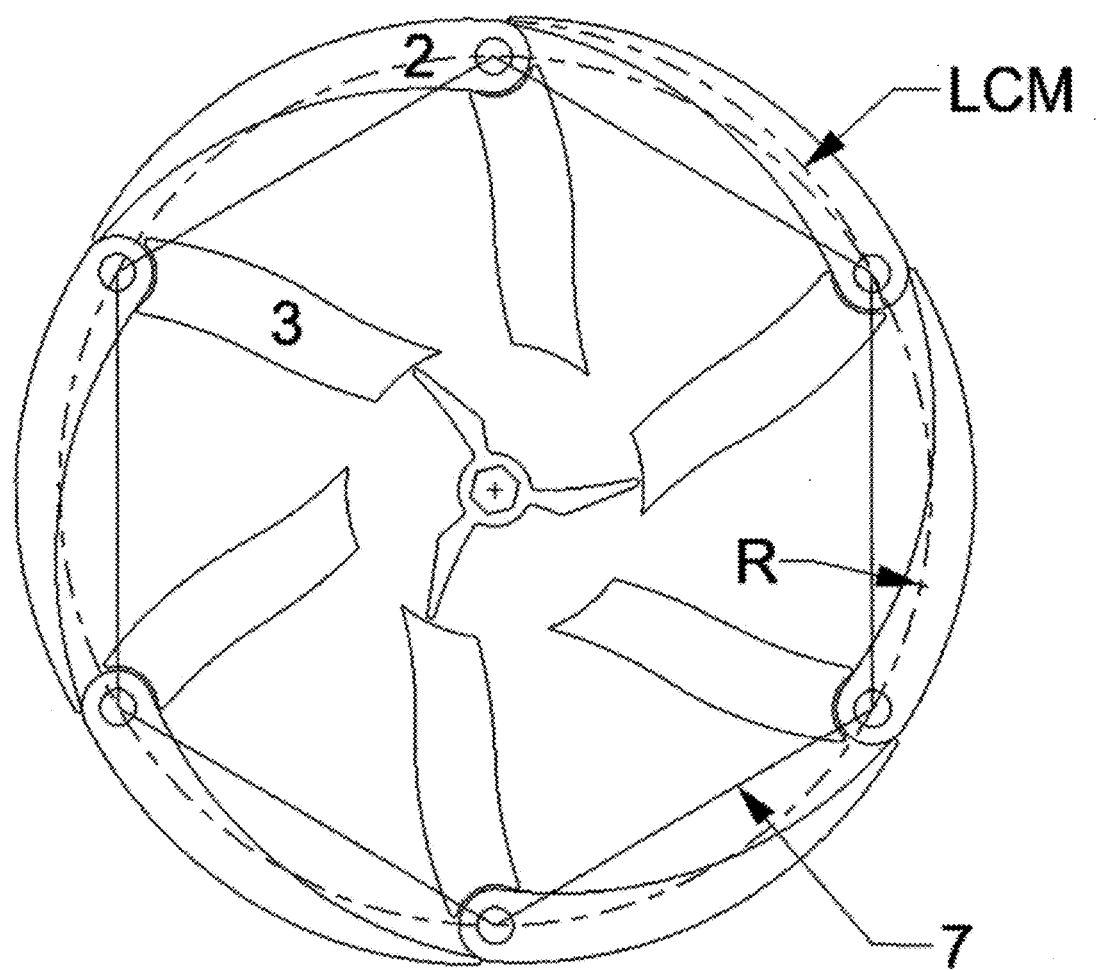
FIG. 2: shows a top view of the vertical axis wind turbine with air flow control wherein showing articulated deflector vanes closed, the hexagonal structure (7), hexagon radius (R) and mean curvature line (LCM) for the moveable part (2) of an articulated deflector vane.

FIG. 2': shows a top view of the vertical axis hydraulic turbine with liquid flow control wherein articulated deflector vanes (1) are shown closed, the hexagonal structure (7), the hexagon radius (R) and the mean curvature line (LCM) for the moveable part (2) of an articulated deflector vane. It has a hollow rotor of 6 vanes of a shark fin type.

Figure 3:
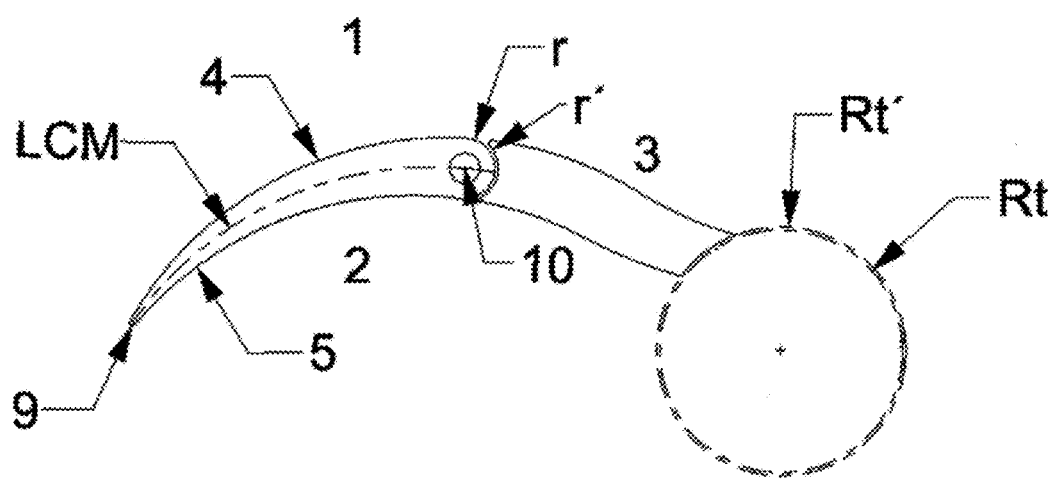
FIG. 3: shows an articulated deflector vane (1) in its open position of the moving part (2) and its fixed part (3), with the circle radius (Rt) generated by the rotation of the rotor vanes, the zone corresponding to the upper (4) and lower surface (5) of the movable part, with the radius known as curvature radius (r) of the leading edge (10) and forming an acute angle on the narrowest portion of the moveable part profile, which corresponds to the outer end of the moveable part and which is known as the trailing edge (9) considering the air foil of the moving part; it is shown the radius (r') corresponding to the side of the fixed part (3) closest to the moveable part and the radius (Rt') corresponding to the side of the fixed part (3) closest to the rotor. In the figure, the mean curvature line (LCM) for the moveable part (2) is shown. In this figure it can be seen that the final section of the rotor close to the fixed part (3) changes the direction of its curvature to allow higher performance as the fluid enters tangentially radius Rt generated by rotation of the rotor vanes.

FIG. 3: shows an articulated deflector vane (1) in the open position with its moveable part (2) and its fixed part (3), which shows the circle radius (Rt) generated by the rotation of the rotor vanes, the zones corresponding to the upper (4) and lower surface (5) of the movable part, with the radius known as the radius of curvature (r) of the leading edge (10) and forming an acute angle on the narrowest portion of the moveable part profile, which corresponds to the outer end of the moveable part and which is known as the trailing edge (9) considering the airfoil of the moving part, it is shown the radius (r') corresponding to the side of the fixed part (3) closest to the movable part and the radius (Rt') corresponding to the side of the fixed part (3) closest to the rotor. In the figure, the mean curvature line (LCM) for the moveable part (2) is shown. In the final section of the rotor close to the fixed part (3) it can be observed that the same changes of course and direction of its curvature to allow a higher performance as the fluid enters tangentially to radius generated by the rotation of the rotor vanes.

Figure 4:
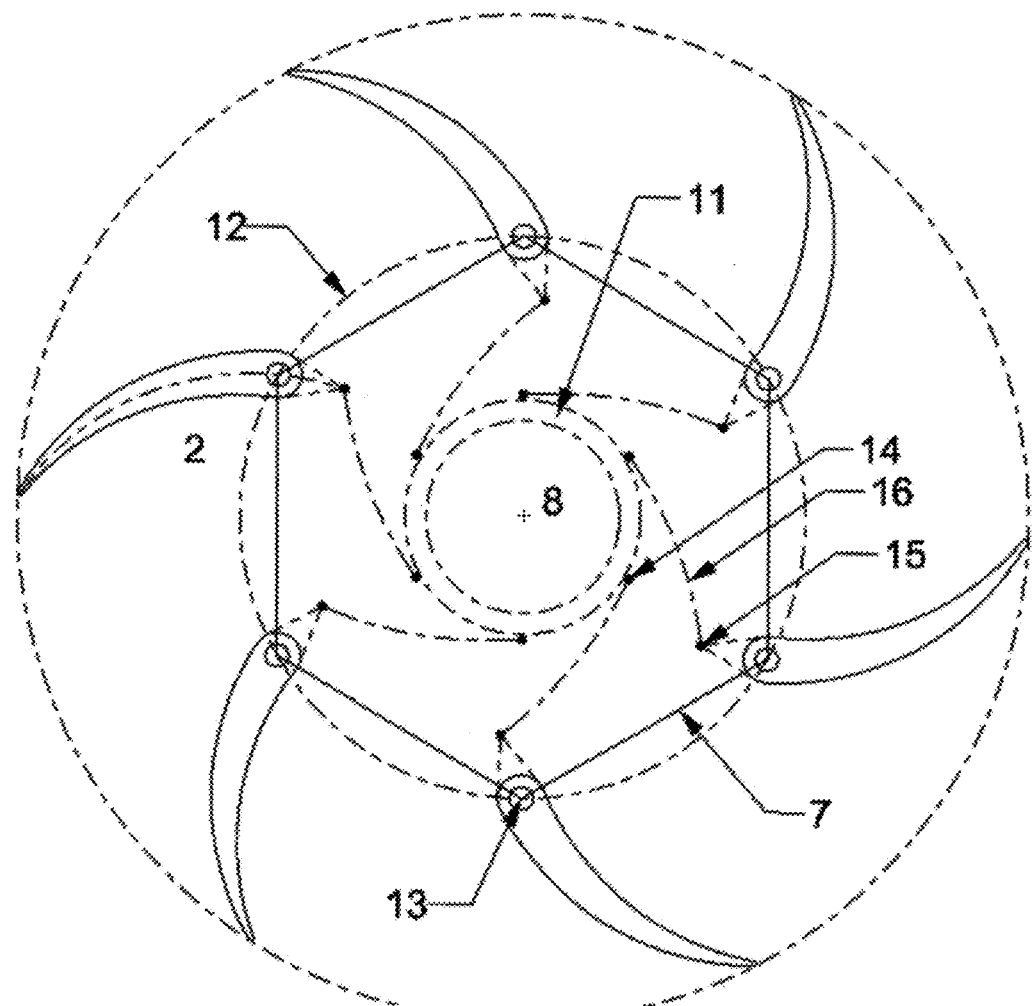
FIG. 4: shows a top view of the vertical axis wind turbine with air flow control sowing the movable part (2) of the articulated deflector vanes open, the hexagonal structure (7) with the vertices of the hexagon (13) where the vertical axes are parallel to the center axis of the hexagon (8), the circumference of the outermost dotted line (12) corresponds to the combination of all the lines of mean curvature of the six moving parts (2) of the articulated deflector vanes when these are closed; there is shown a locking system of the moving parts in dotted line which can be found on the basis of the hexagonal structure formed by an annular piece (11) centered on the center axis of the hexagon (8) which has protuberances (14) that when rotating changes the stress on the angular straps (16) which exert a force on projections (15) which are located at the bottom of the six moving parts (2) of the articulated deflector vanes producing the closure of the moving parts.

FIG. 4: shows a top view of the vertical axis hydraulic turbine with liquid flow control wherein it is shown the movable part (2) of the articulated deflector vanes open, the hexagonal structure (7) with the vertices of the hexagon (13)

where the vertical axes are parallel to the center axis of the hexagon (8), the circumference of the outermost dotted line (12) corresponds to the union of all the mean curvature lines of the six moving parts (2) of the articulated deflector vanes when these are closed; it is shown a locking system of the moving parts in dotted line which can be found on the base of the hexagonal structure formed by an annular piece (11) centered on the axis of the hexagon center (8) which has protuberances (14) that upon rotating modifies the stress on angular straps (16) that exert a force on the projections (15) which are located at the bottom of the six moving parts (2) of the articulated deflector vanes producing the closure of the moving parts.

Figure 5:
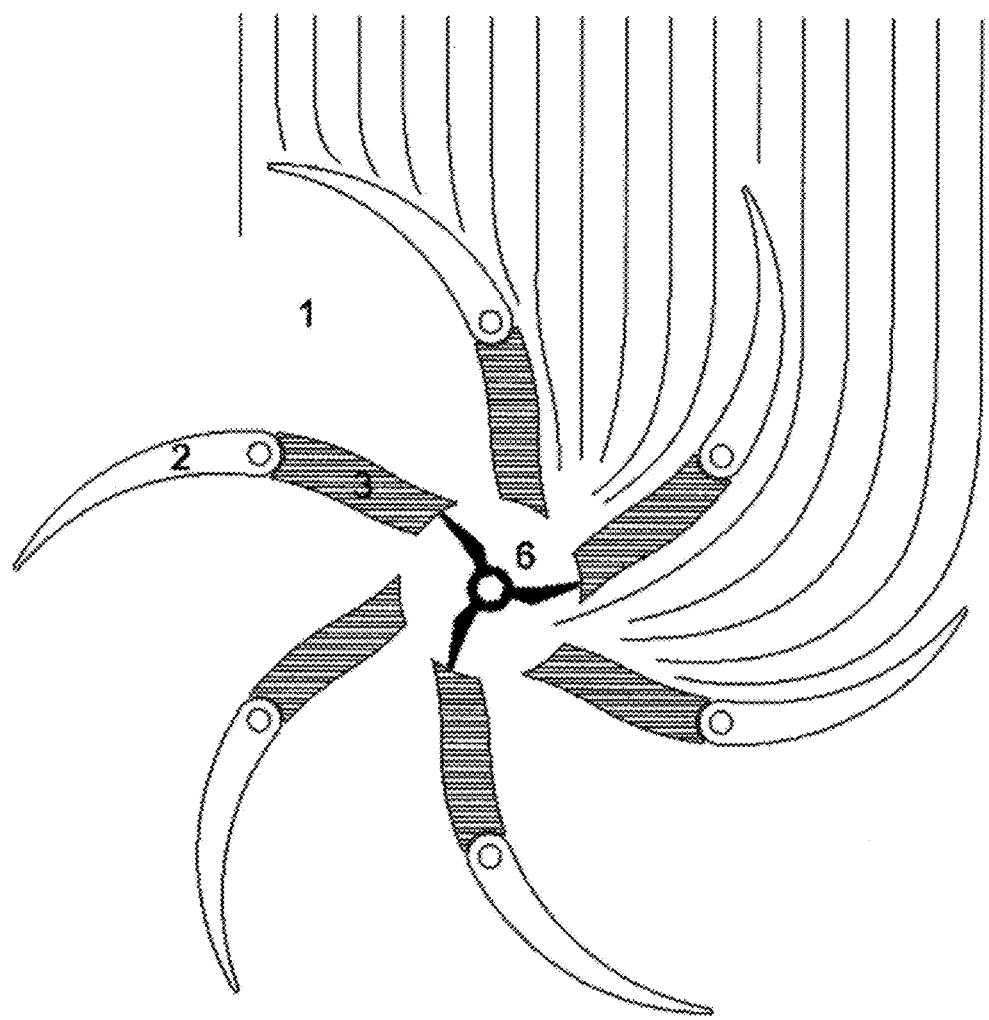
FIG. 5 shows a top view of the vertical axis wind turbine with air flow control, that, for a better understanding does not show the hexagonal structure, wherein it is shown in vertical lines on the top of the drawing the wind capture of the articulated deflector vanes (1) open with its moveable part (2) and the fixed part (3), wherein the moving parts capture the wind from the side the same comes and makes it impinge on the fixed part (3) concentrating the same on the rotor (6), where it can be seen that the final section close to the rotor of the fixed part (3) changes the course and direction of its curvature to allow a higher performance as the air enters tangentially to radius generated by the rotation of the rotor vanes.

FIG. 5': shows a top view of the vertical axis hydraulic turbine with fluid flow control that, for a better understanding does not show the hexagonal structure, wherein it is shown in vertical lines in the top of the drawing the hydraulic capture of the articulated deflector vanes (1) open with their moveable part (2) and the fixed part (3), wherein the moving parts capture the entire flow of fluid from the side the same enters and makes it impinge on the fixed part (3) which focuses it on the hollow rotor (6). The shark fin shape of the hollow rotor vanes improves the capture of the flow of fluid on the inner part of the fin allowing the unused fluid to escape through the external portion of the same. Furthermore it can be seen that the final section of the rotor close to the fixed part (3) changes the course and direction of its curvature to attain a higher performance as the liquid fluid enters tangentially to the circle of radius generated by the rotating rotor vanes.

Figure 6:
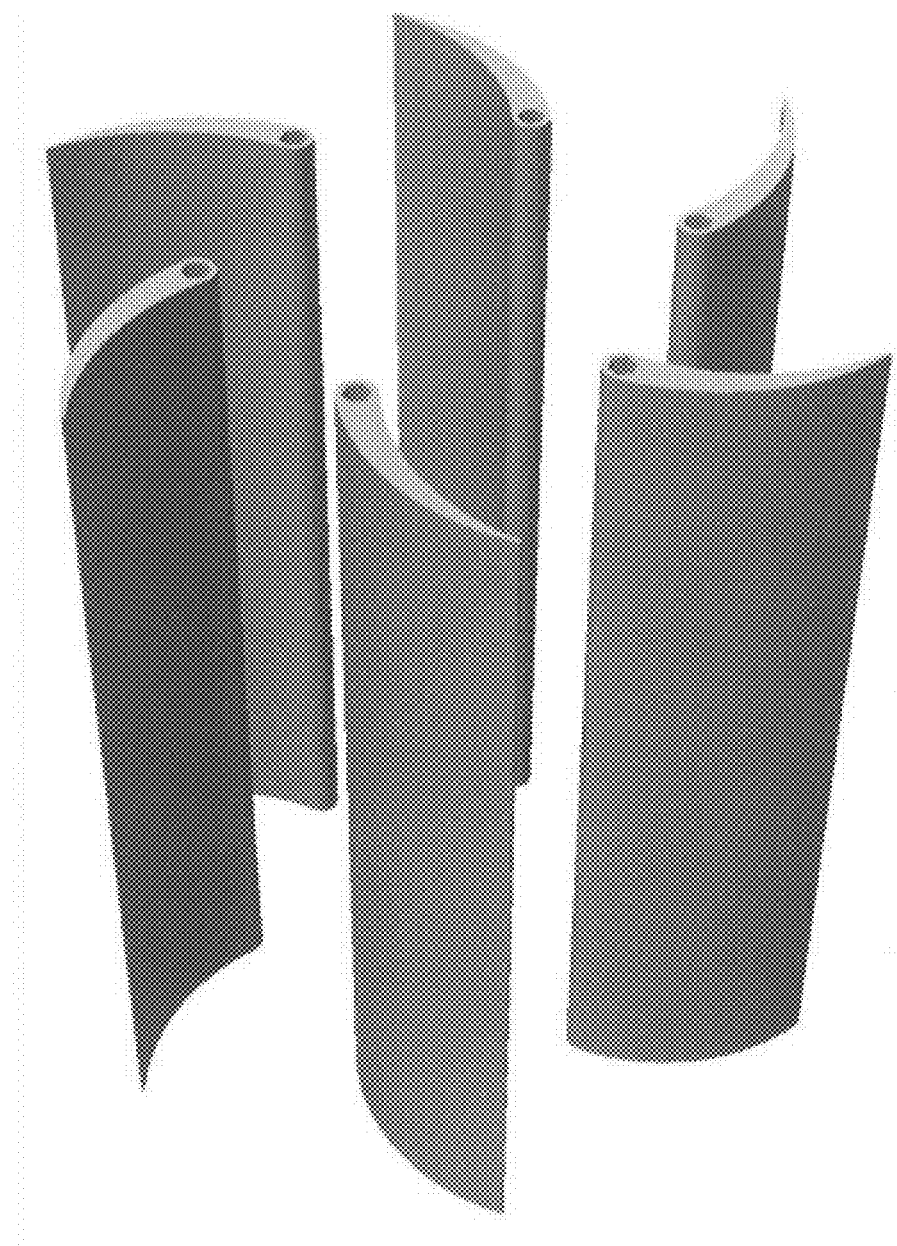
FIG. 6 shows perspective views of the six moving parts of each articulated deflector vane.

FIG. 6 shows perspective views of the movable part of six articulated deflector vanes with an opening wherein the shaft is introduced to produce rotation.

Figure 7:
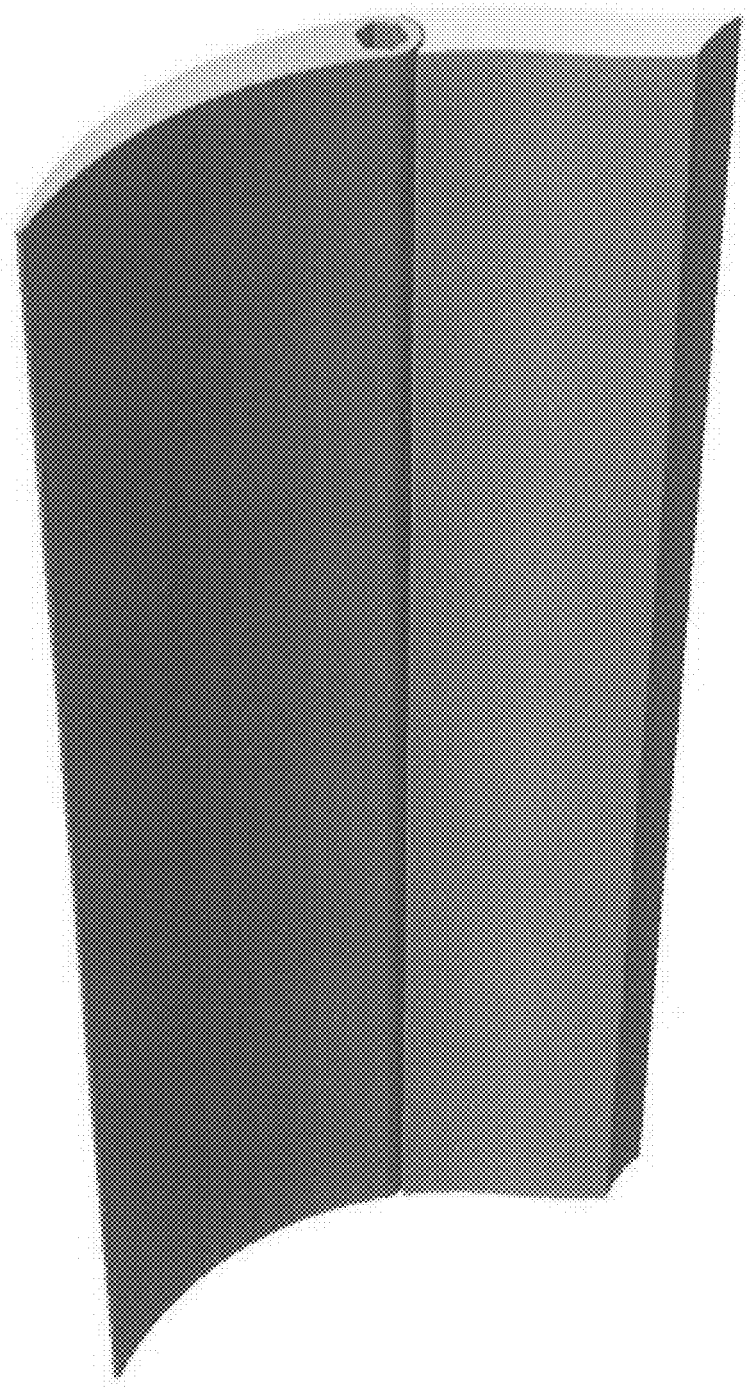
FIG. 7: shows a side perspective view of the articulated deflector vane.

FIG. 7 shows a side perspective view of the articulated deflector vane with the hole wherein the shaft enters to produce rotation.

Figure 8:
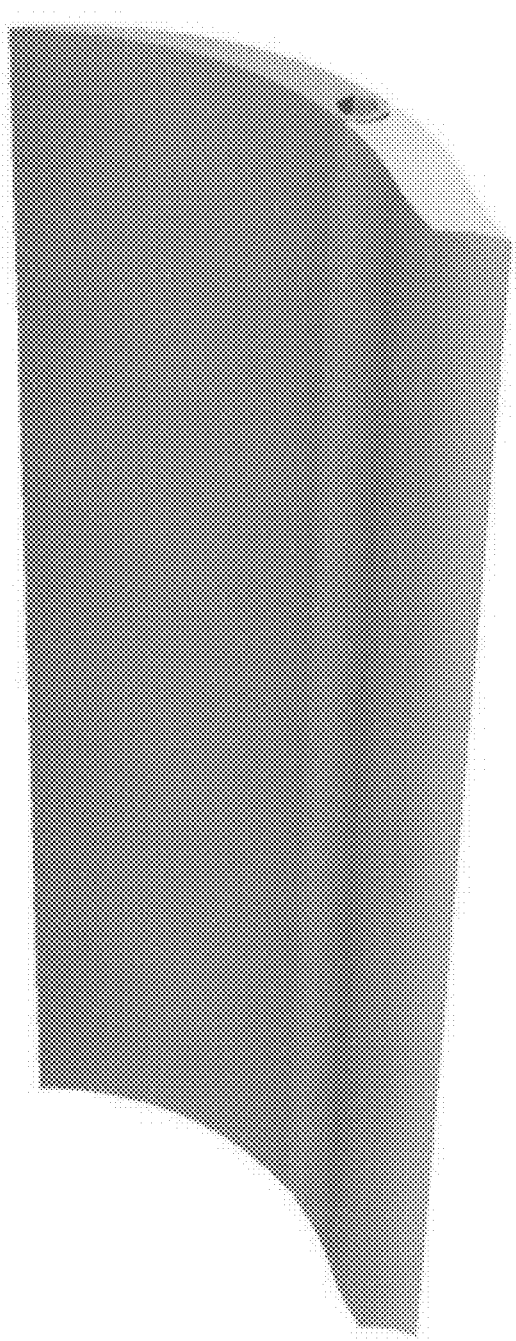
FIG. 8: shows a perspective view of the articulated deflector vane seen from the rotor area.

FIG. 8: shows a perspective view of the articulated deflector vane seen from the rotor zone with the opening wherein the shaft enters to produce rotation. In the same it is possible to observe that the final section close to the rotor of the fixed part changes of course and direction to attain a higher performance as the fluid (liquid) enters tangentially to the circle of radius generated by rotation of the rotor vanes.

Figure 9:
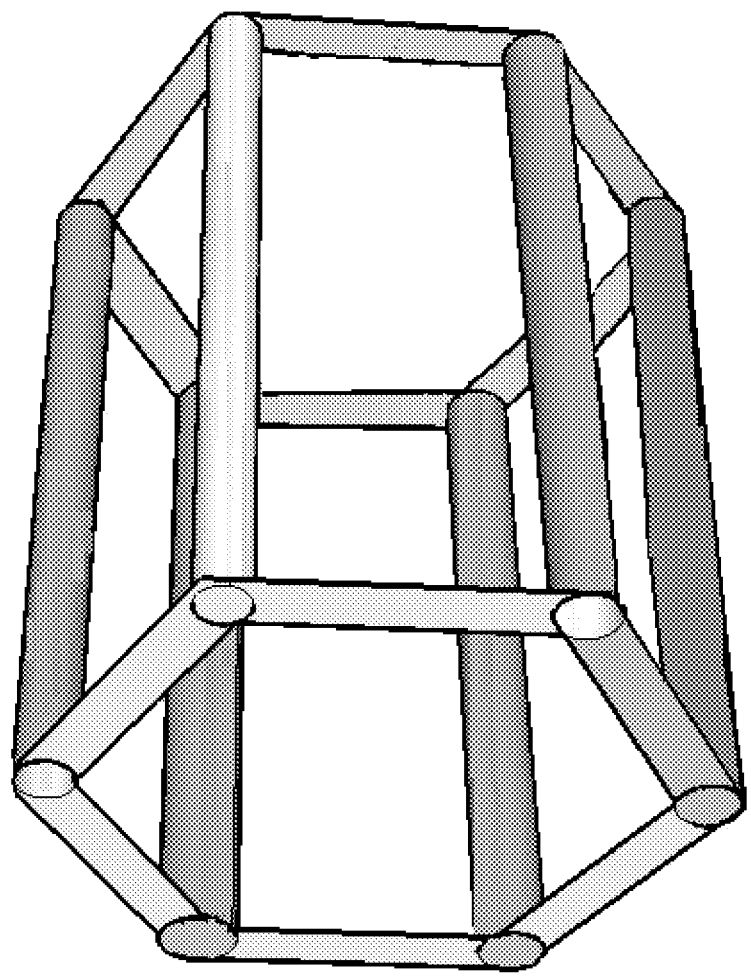
FIG. 9: shows a side perspective view from below the regular hexagonal structure of radius R in the form of a parallelepiped-shaped.

FIG. 9 shows a side perspective view from below of the regular hexagonal structure of radius R, parallelepiped-shaped, each of the axis are inserted in the holes of each articulated deflector vane allowing rotation thereof about said axis.

Figure 10:
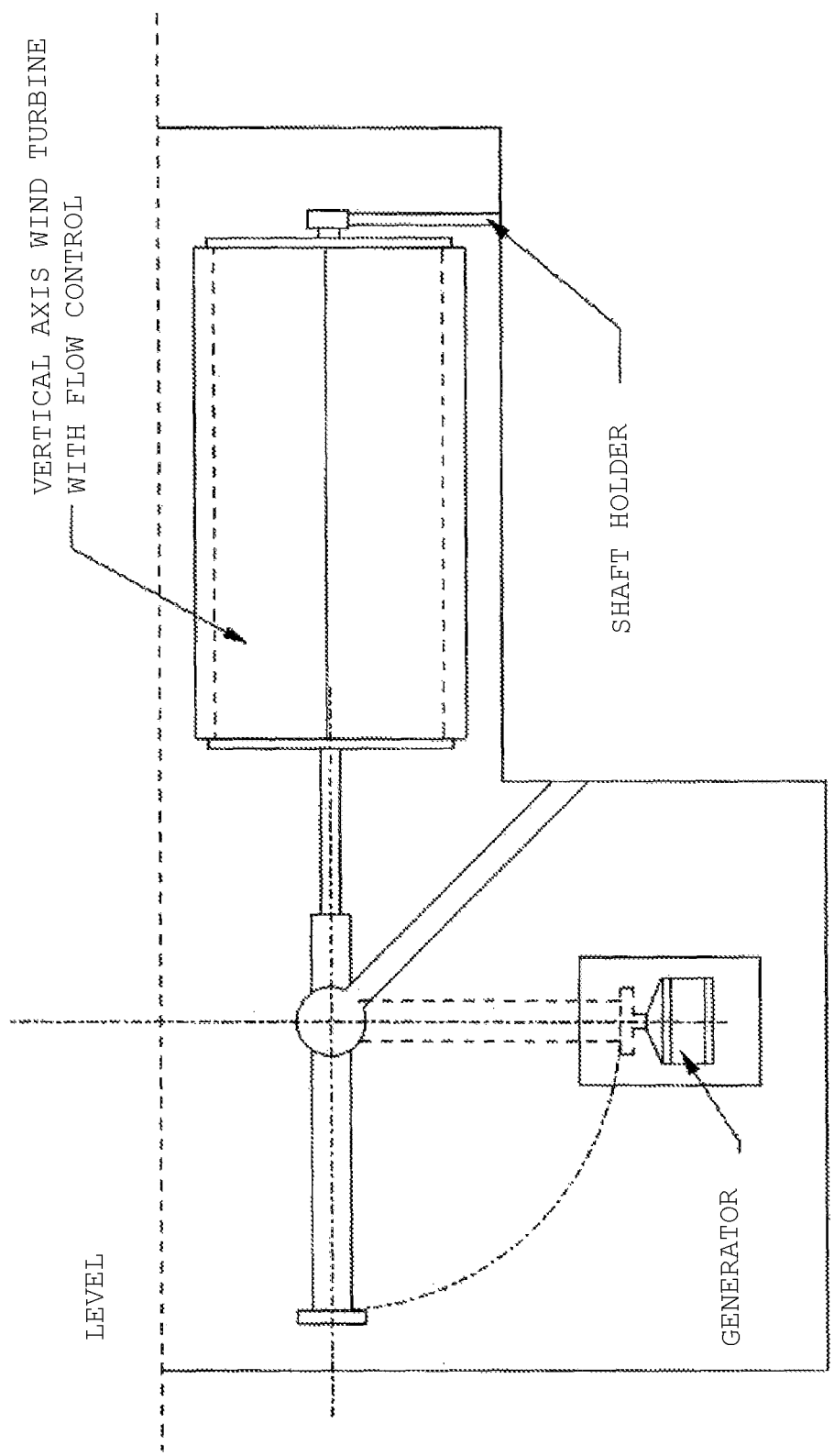
FIG. 10 shows a side view of the vertical axis wind turbine with air flow control with a system for protecting the same within a well; in this case the turbine is lying within the well, the system has a means to stop the wind turbine and to couple its shaft with the generator, there is a shaft holder to keep it lying.
Figure 11:
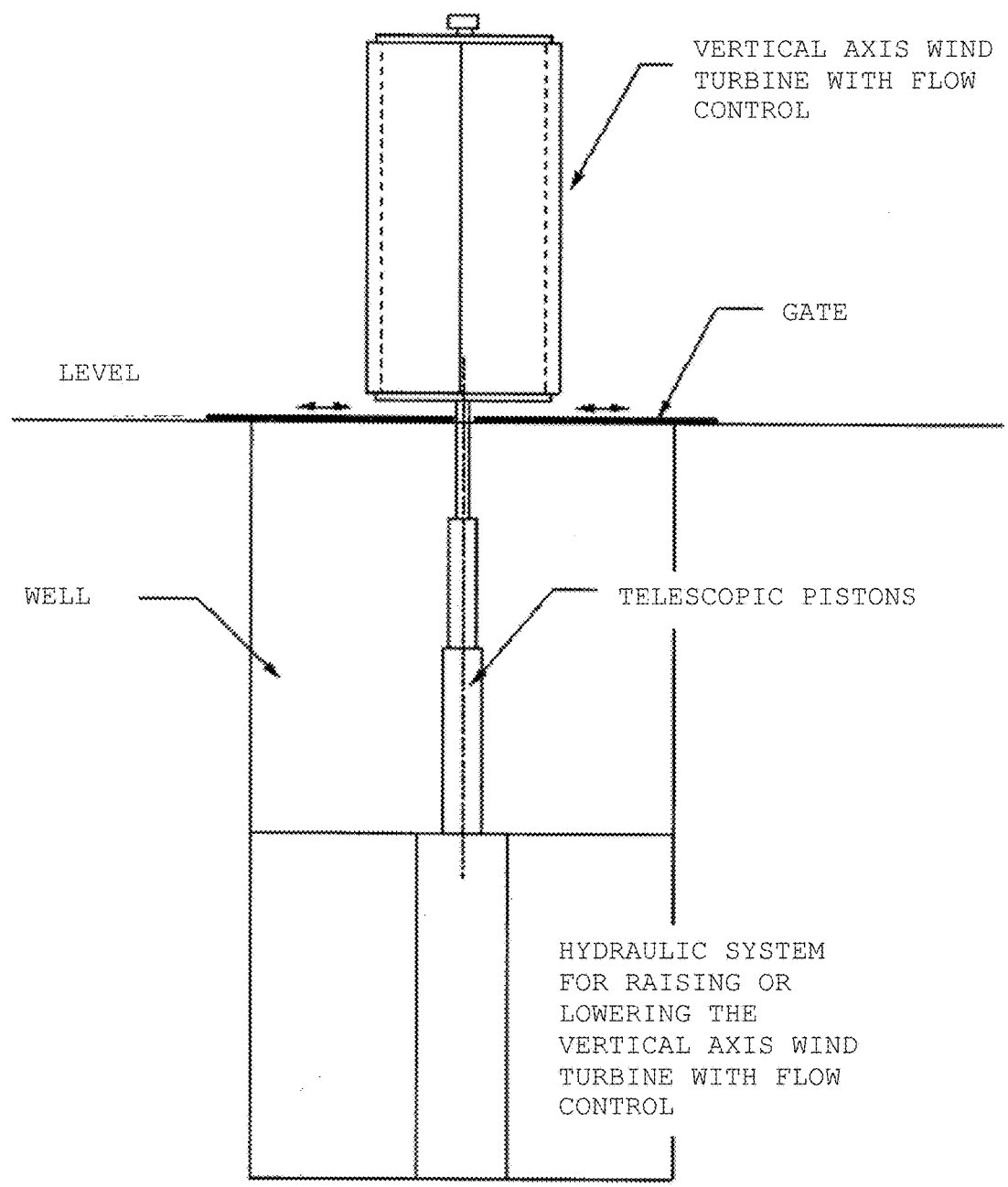
FIG. 11 shows a side view of the vertical axis wind turbine with air flow control with a system for protecting the same inside a well, in this case by a hydraulic system with telescopic pistons the turbine is raised or lowered into the well, which can be covered by gates.
Figure 12:
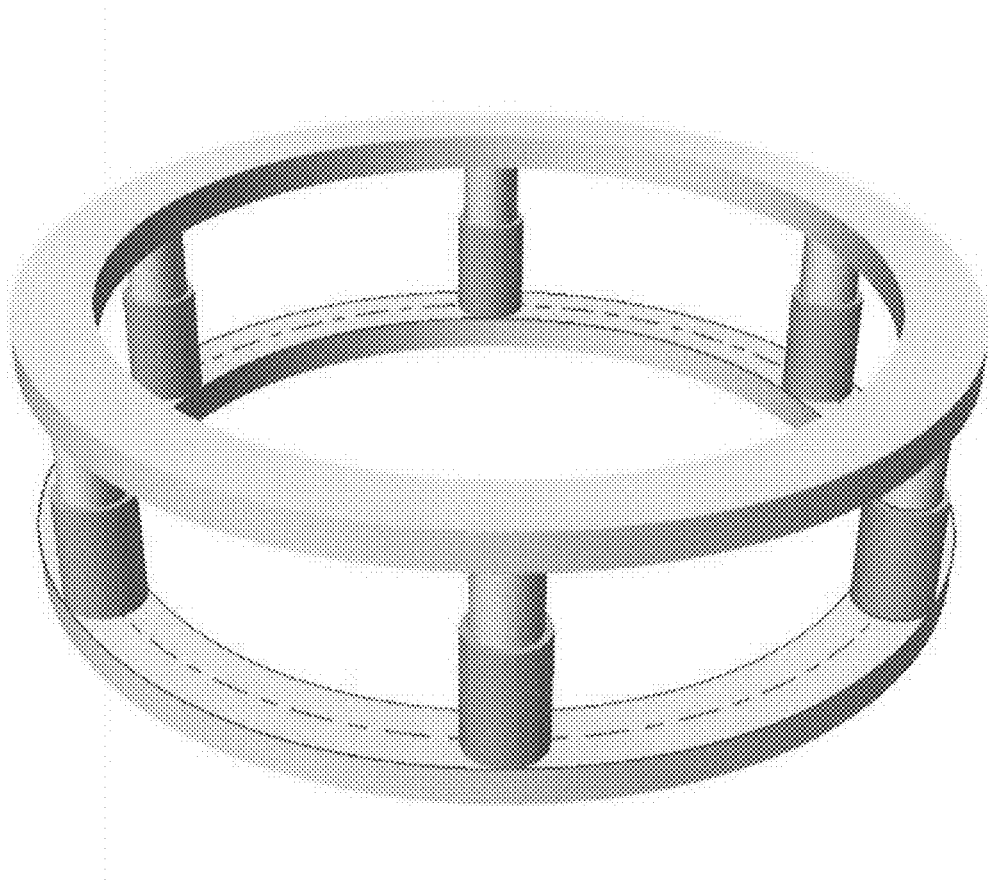
FIG. 12 shows an antiseismic module to couple the vertical axis wind turbine with air flow control to the ground or between more than one vertical axis wind turbine with air flow control staked one above the other. This module comprises two rings linked by six elastic shock absorbers each comprising a housing and a piston including inside elastic, hydraulic, pneumatic means, such as high impact rubber among others.

FIG. 10': shows a top view of the vertical axis hydraulic turbine with liquid flow control wherein the 12 shark fin type vane hollow rotor (6) is of a larger size as it has more vanes, while in the articulated deflector vanes (1) the fixed part (3) decreases in size in comparison with the vertical axis hydraulic turbine with fluid flow control of FIG. 1'.

DESCRIPTION OF THE INVENTION

When the wind and hydraulic turbine with flow control of this invention operates in wind mode, hereinafter it will be referred to as "vertical axis wind turbine with flow control":

This vertical axis wind turbine with flow control receives on the rotor vanes the powered and homogenized air along its entire length, having a regulated opening of the articulated deflector vane by means of moving parts of the same that control the entry of air that comes from any direction and fixed parts associated that concentrate the air on the rotor vanes at a higher speed and uniformly.

The vertical axis wind turbine with flow control comprises a regular hexagonal type structure of radius R, parallelepiped-shaped, inside which a rotor with three vanes rotates about a vertical axis which is located in the center of the hexagon seen from above, wherein said vanes when rotating generate a circle of radius Rt, further comprising articulated deflector vanes, which account for and concentrate the incoming air flow on the rotor vanes, from wind entry side to the turbine and diffuse the air flow exiting from the rotor vanes, side opposite to the wind entry side to the turbine.

The vertical axis wind turbine with flow control, which has six articulated deflector vanes, which comprise a fixed portion included in the regular hexagonal structure and another moveable part, arc-shaped on their outer walls, which may rotate about axes parallel to the rotor axis which are on each of the six vertices of the hexagonal type regular structure viewed from above.

Said fixed portion of the articulated deflector vanes comprises the vertical wind turbine enhancer to use the incoming airflow; said fixed portion of each vane comprises arcs that continue the curvature of the moveable part on its portion closest to the moveable part, and then change the course and direction of the curvature at the final section near the rotor, this change of course and direction of curvature allows and improve performance as the fluid (air) enters tangentially to the circle of radius generated by rotation of the rotor vanes.

The air is forced into the space between two fixed parts of the vanes which narrows in the direction of the axis and which is further optimized by changing the course and direction of curvature in the final section of the fixed part closed to the rotor to enable a higher performance as the fluid enters tangentially to the circle of radius generated by the rotation of the rotor vanes, so that the air flow is accelerated in the vicinity of the rotor, that gets energy to provide electricity.

The fixed part of the articulated deflector vane at the side where the air enters the system functions as airflow concentrators on the rotor vanes, while the articulated deflector vane located at the side from where the airflow exits the system function as flow diffusers of the air that made the rotor vane rotate.

Each of the moving parts of the six articulated deflector vanes arched shaped on their outer walls comprise vertical plates of laminar configuration positioned in the same direction of rotation of the rotor to use the incident wind in any direction.

Each moveable part of each of the six articulated deflector vanes located on axes parallel to the rotor axis which are on each of the six vertices of the hexagonal type regular structure viewed from above, can rotate about corresponding axis parallel to the rotor axis which is located at each vertex of the regular hexagonal structure so as to close the wind inlet towards the rotor between said deflector vane and the next articulated deflector vane, if said articulated deflector vanes are located on the wind entry side or close the wind output from the rotor between said articulated deflector vane and the next, if said articulated deflectors vane are located on the side opposite to the wind entry side.

Said vertical axis wind turbine with flow control is characterized in that when the movable parts of each of the six articulated deflector vanes of the hexagonal system is rotated so as to close the inlet and outlet of the wind to and from the rotor between the six articulated deflector vanes, the mean curvature line of the moving parts of each of the six articulated deflector vanes generates a circle of radius R viewed from above (if attached between the six vertices of the hexagon).

The mean curvature line of the movable portion of each articulated deflector vane equals the arc passing through the middle of the fixed part of each articulated deflector vane and extends to the center of the regular hexagonal structure of radius R. This mean curvature line is equal to the arc corresponding to ⅙ of the circumference of radius R, thus joining the six lines of curvature would generate a circle of radius R.

In the same way the arc passing through the middle of the fixed part of each articulated deflector vane and extends to the center of the regular hexagonal structure of radius R is also equal to the arc corresponding to ⅙ of the circumference of radius R.

By regulating the size of the fixed portion of each articulated deflector vane depending on the size of the rotor a higher or lower rotor speed is achieved for a flow equal to the incident wind, that is, the smaller is the fixed part and the greater is the rotor size, the rotor rotation speed is slower, in the same manner, the greater is the size of the fixed part and the smaller the size of the rotor, the rotor rotation speed is higher.

Whereas the movable part of the articulated deflector vanes has a profile aerodynamically designed in the form of an aircraft wing, the same has the so-called upper surface on its upper portion and the lower surface on the bottom.

Considering such a profile of the movable part of the articulated deflector vanes as an aircraft wing, it has an upper convex area on the top surface and a lower concave region in the lower surface separated by the mean curvature line, being the convex upper zone coupled to the lower concave region through a convex semicircle of radius r on the widest part of the profile where the radius r is known as a radius of curvature of the leading edge and forming an acute angle on the less wide portion of the profile, which corresponds to the outer end of the movable part which is known as trailing edge considering the airfoil.

The moveable part of each vane has an average curvature equal to ⅙ of a circle of radius R.

The fixed part of the articulated deflector vanes has a profile that continues the convex zone of the top surface of the moveable part and the concave zone of the lower surface of the movable part in the lower zone, wherein in the final section near the rotor of the fixed part the curvature changes of course and direction to allow a higher performance as the fluid enters tangentially to the circle of radius generated by the rotation of the rotor vanes. The change of curvature changes the convexity of the upper portion to concavity and in the same way the bottom concavity changes to convexity.

The upper convex zone merges with the concave bottom zone of the movable part side on the fixed part of the articulated deflector vane by means of a concave semicircle of radius r wherein r'>r due to the change of curvature mentioned, the upper concave zone merges with the bottom convex zone on the rotor side by a concave semicircle of radius Rt' wherein Rt'>Rt The concavity of the semicircle of radius r' on the side of the moveable part allows as r'>r that the moveable part rotates about the corresponding axis parallel to the rotor axis which are in one of the six vertices of the hexagonal regular structure, so that no friction occurs between the concave and convex circular walls generated by the semicircles of radii r' and r.

The center of the concave semicircle of radius r' and the center of convex semicircle of radius r are coincident.

The concavity of the semicircle of radius Rt' of the fixed portion of the rotor side being Rt'>Rt allows that the rotor vanes generating a circle of radius Rt when rotating do not rub the concave circular walls of the fixed part on the side of the rotor.

The center of the semicircle of radius Rt' and the center of the circumference Rt are coincident with the center of the regular hexagonal structure of radius R.

It is preferred a parallelepiped-shaped hexagonal system without walls assembled with pipes, profiles or plates located at the edges so as not to have side walls to prevent air from entering or exiting when necessary.

The pipes, profiles or plates which form the parallelepiped shaped regular hexagonal structure of radius R, may be of metal or any other material that supports the needs of the product depending on its size.

Among the preferred materials are metals, plastics, wood or any material used in construction and combinations thereof.

These same materials may be used in combination for the construction of the rotor and the articulated deflector vanes.

The rotor of the vertical axis wind turbine with flow control comprises three vanes which generate three separate and distinct zones associated with each other wherein the vanes comprise vertical plates of laminar configuration oriented in the same direction of rotation of the rotor to use the incident wind in any direction.

In order to modify the opening or closing of the moveable part of each articulated deflector vane the wind turbine described herein has electrical, mechanical, hydraulic or pneumatic means allowing the closure of the movable portion thereof to be used in case of presence of strong winds that can damage the integrity of the structure.

Such electrical, mechanical, hydraulic or pneumatic means allow the closure of the moveable part and can be actuated automatically when the wind exceeds a predetermined speed which is detected by an anemometer included in the structure.

To protect the integrity of the vertical axis wind turbine with flow control, the same has lifting and lowering means so that it can be hidden underground in case of presence of hurricanes or tornadoes.

The system can be shutdown in a very short time, making it possible to be hidden underground in case of presence of hurricanes or tornadoes.

In this case, wind energy, actually the kinetic energy of the moving air, provides mechanical energy to the rotor which, through a mechanical drive system rotates the rotor of a generator, usually three phase alternator, which converts rotational mechanical energy into electrical energy.

The wind generator described herein has some technical features that allow using the wind from any direction to generate energy, especially electricity, and being its installation and configuration simple, it is ideal for home use or any other use.

The rotor vanes have a laminar configuration, in a vertical position and with a curved profile in a plan view, said curved profile is positioned in the direction of rotation to use the wind coming from any direction caused by the articulated deflector vane.

This wind generator has the advantage that there is no need to position it such that the central rotary axis is aligned with the wind direction, but the wind moves the rotor vanes as any incident wind is taken by the movable part of the articulated deflector vanes.

To prevent damages to the machine in case of strong wind or storm, said device has a mechanism to close the moving vanes so as to form a circumference with no surfaces exposed to wind.

Several vertical axis wind turbines with flow control can be built in the form of modules that can be stacked or adjacent to each other.

Stacked modules may share the same axis of the rotors and an additional advantage in this case is that if the hexagonal structures are regularly offset this configuration may receive the wind enhancing its performance.

For installation in seismic areas, the vertical axis wind turbine with air flow control may include a seismic module which allows the coupling between the vertical axis wind turbine with air flow control and the ground or between more than one vertical axis wind turbine with air flow control stacked one above the other. This module comprises two rings linked by six elastic shock absorbers each comprising a housing and a piston including elastic, hydraulic, pneumatic means or for example high impact rubber. On the rings the vertical axis wind turbine with air flow control are mounted.

Differences and Advantages Over Vertical Axis Wind Systems

The moveable and fixed vanes associated to this system can capture an air mass several times larger and transmit its energy by increasing its speed impacting directly on the rotor vane.

To homogenize the flow of air, pressure exerted on the vane is more uniform avoiding stresses and vibrations with a loss of useful power facilitating and simplifying its construction design.

It allows regulating the start speed similar to a SAVONIUS system and by increasing the opening of the moving vanes speed and overall performance increases over a Darrieus system as it operates on resistance force and high speed, combining the advantages of both traditional vertical axis wind systems.

Summarizing, this is a direct drive and high speed wind turbine, which advantages are:

Maximum use of wind energy as transmits the vector by increasing wind speed impinging on the rotor vane directly.

Increase due to narrowing of the air outlet at the end of the fixed portion closest to the rotor of each of the articulated deflector vanes.

General Advantages Over Horizontal Axis Wind Systems

Support on two or more sites of the rotor with the structure avoiding vibrations and fatigue of material.

Little or minimal sonority.

Stacked modular use.

Unique rotor with offset vanes for an easier start and to avoid vibrations and parasitic frequencies.

Generator at ground level or underground with obvious maintenance advantages. No risk of operators working at height and at lower cost.

Lubrication equipment (tanks, pumps, filters, etc.) at ground level.

Overall modular construction system in factory, allows a quick and secure assembly in permanent strong wind areas either in high mountains or seas, etc. and difficult access areas.

Use of conventional materials (resins and stainless steel only).

Solid and robust construction with little sound and visual impact and not aggressive to wildlife and birds in particular.

Safe, as rotor vanes cannot detach as they are installed within the equipment protected by the fixed vanes, allowing use in urban areas (buildings, towers, etc.)

It is the only equipment that can be designed in different heights and vane length.

Being a structure with hexagonal base, the width of the vane plus the fixed vane width equals the width of the movable vane, being able to choose these parameters according to the best aerodynamics.

Suitable for marine and river use on platforms, ships, buoys, etc.

Multidirectional, fully automatic, using the wind even in turbulences.

Simple braking system without wear or rubbing, simply closing the moving vanes (see the top view of the closure system).

High range of wind speeds from a minimum of 3 km/hour to 70 km/hour.

Upon a weather alert, the system can be closed completely and shuts down; restart is immediate.

Only wind equipment to be used in hurricane zones as it can be installed fully underground.

The half-life and low cost of construction and maintenance far exceeds any wind equipment today, allowing its use in financial plans associated to its operation, by issuing green and/or energy bonds.

Allows affordable insurance.

When the wind and hydraulic turbine with flow control of this invention operates in hydraulic mode, hereinafter it will be referred as "vertical axis hydraulic turbine with flow control":

This vertical axis hydraulic turbine with liquid flow control receives on the rotor vanes the powered and homogenized flow of fluid along its entire length, having a regulated opening of the articulated deflector vane by means of the moving vanes that control the entry of liquid that comes in any direction and the fixed vanes associated that concentrate the flow of fluid on the rotor vanes at a higher speed and uniformly.

The vertical axis hydraulic turbine with flow control comprises a hexagonal regular structure of a radius R, parallelepiped-shaped, inside which a rotor rotates with three vanes about a vertical axis which is located in the center the hexagon as seen from above, wherein said vanes have a shark fin shape and when rotating generate a circumference of radius Rt, further comprising six articulated deflector vanes which grab and concentrate the flow of liquid entering the rotor vanes, from the flow of liquid entry side to the turbine and diffuse the flow of liquid exiting the rotor vanes, from the side opposite to the flow of liquid entry side to the turbine.

The vertical axis hydraulic turbine with flow control, has six articulated deflector vanes, which comprise a fixed portion included in the regular hexagonal structure and another moveable part that is arc-shaped on its outer walls and rotatable about axes parallel to the rotor axis which are on each of the six vertices of the hexagonal type regular structure viewed from above.

The fixed portion of the articulated deflector vanes comprises the enhancer of the vertical hydraulic turbine to use the incoming fluid flow; said fixed portion of each vane comprises arcs that continue the curvature of the moveable portion of said vanes in the area closer to the moving part. Said fixed portion of the articulated deflector vanes comprises the enhancer of the vertical wind turbine to use the incoming airflow; said fixed portion of each vane comprises arcs that continue the curvature of the moveable portion of said vanes on its side closest to the moving part, to then change the course and direction of its curvature near the final section to the rotor.

This change of course and direction of its curvature enables a higher performance as the fluid (air) enters tangentially to the circle of radius generated by the rotation of the rotor vanes.

The fixed part of the articulated deflector vanes has a profile that continues the convex zone of the top surface of the moveable part and the concave zone of the lower surface of the moveable part in the lower zone, wherein in the final section close to the rotor of the fixed part, the curvature changes course and direction to allow a higher performance as the fluid enters tangentially to the circle of radius generated by the rotation of the rotor vanes, allowing, due to this curvature change, to capture the incoming fluid, which is forced into the space between two fixed vanes that narrows in the direction of the axis, so that the fluid flow is accelerated in the vicinity of the rotor, that gets energy to provide electricity.

The fixed part of the articulated deflector vane at the side where the liquid enters the system functions as airflow concentrators on the rotor vanes, while the articulated deflector vane located at the side from where the airflow exits the system function as flow diffusers of the liquid that made the rotor vane rotate.

Each of the moving parts of the six articulated deflector vanes arched shaped on their outer walls comprise vertical plates of laminar configuration oriented in the same direction of rotation of the rotor to use the incident fluid flow in any direction.

The fixed parts of each of the six articulated deflector vanes also comprise vertical plates of laminar configuration.

Each moveable part of each of the six articulated deflector vanes located on the axes parallel to the rotor axis which are on each of the six vertices of the hexagonal type regular structure viewed from above, can rotate about the axis parallel to the corresponding rotor axis which is located at each vertex of the regular hexagonal structure so as to close the fluid inlet towards the rotor between said articulated deflector vane and the next, if said articulated deflector vanes are located on the fluid entry side or close the fluid outlet from the rotor between said articulated deflector vane and the next, if said articulated deflector vanes are located on the side opposite to the liquid entry side.

Said vertical axis hydraulic turbine with flow control is characterized in that when the movable parts of each of the corresponding six articulated deflector vanes of the hexagonal system is rotated so as to close the fluid input and output to and from the rotor between them, the mean curvature line of the moving parts of each of the six articulated deflector vanes form a circle of radius R viewed from above (if attached between the six vertices of the hexagon).

The mean curvature line of the movable portion of each articulated deflector vane equals the arc passing through the middle of the fixed part of each articulated deflector vane and extends to the center of the regular hexagonal structure of radius R. This mean curvature line is equal to the arc corresponding to ⅙ of the circumference of radius R. In the same way the arc passing through the middle of the fixed part of each articulated deflector vane and extending to the center of the regular hexagonal structure of radius R is also equal to the arc corresponding to ⅙ of the circumference of radius R.

By regulating the size of the fixed portion of each articulated deflector vane depending on the size of the rotor a higher or lower rotor speed is achieved for a flow equal to the incident fluid, that is, the smaller is the fixed part and the greater is the rotor size, the rotor rotation speed is slower, in the same manner, the greater is the size of the fixed part and the smaller the size of the rotor, the rotor rotation speed is higher.

Generally for a hydraulic turbine of this type it is necessary using smaller fixed parts of the articulated deflector vane and larger rotor diameters, said fixed portion of each vane comprises arcs that continue the curvature of the moveable portion of said vanes on the portion closest to the moveable part, to then change the course and direction of its curvature at the final section near the rotor.

Whereas the movable part of the articulated deflector vanes has a profile aerodynamically designed in the form of an aircraft wing, the same has the so-called upper surface on its upper portion and the lower surface on the bottom.

Considering such a profile of the movable part of the articulated deflector vanes as an aircraft wing, it has an upper convex area on the top surface and a lower concave region on the lower surface separated by the mean curvature line, being the convex upper zone coupled to the lower concave region through a convex semicircle of radius r on the widest part of the profile where the radius r is known as a radius of curvature of the leading edge and forming an acute angle on the less wide portion of the profile, which corresponds to the outer end of the movable part which is known as trailing edge considering the airfoil.

The moveable part of each articulated deflector vane has the mean curvature line equal to ⅙ of a circle of radius R thus joining the six lines of curvature generate a circle of radius R.

The fixed part of the articulated deflector vanes has a profile that continues the convex zone of the top surface of the moveable part and the concave zone of the lower surface of the moveable part in the lower zone, wherein in the final section close to the rotor of the fixed part, the curvature changes course and direction to allow a higher performance as the fluid enters tangentially to the circle of radius generated by the rotation of the rotor vanes, allowing, due to this curvature change, to capture the incoming fluid, which is forced into the space between two fixed vanes that narrows in the direction of the axis, so that the fluid flow is accelerated in the vicinity of the rotor, that gets energy to provide electricity.

The fixed portion of the articulated deflector vanes in the area closest to the moveable part has a profile which continues the upper surface of the convex zone of the movable part in the upper area, and continues the concave area of the lower surface of the moveable part in the lower area, wherein in the final section of the rotor close to the fixed part the curvature changes course and direction, consequently the upper convex zone turns into a concave zone and the lower concave zone turns into a convex zone on said fixed part, in this way the upper convex zone joins the lower concave zone of the side of the moveable part by a concave semicircle of radius r where r'>r and the upper concave area joins with the lower convex zone of the side of the rotor by a concave semicircle of radius Rt' wherein Rt'>Rt (Rt being the radius of the circle generated by the rotor vanes).

The concavity of the semicircle of radius r' of the moveable part side allows being r'>r that the moveable part rotates about the corresponding axis parallel to the rotor axis which are in one of the six vertices of the hexagonal regular structure, so that no friction occurs between the concave and convex circular walls generated by the semicircles of radii r' and r.

The center of the concave semicircle of radius r' and the center of convex semicircle of radius r are coincident.

The concavity of the semicircle of radius Rt' of the fixed portion of the rotor side being Rt'>Rt allows that the rotor vanes that generate a circle of radius Rt when rotating do not rub the concave circular walls of the fixed part of the rotor side.

The center of the semicircle of radius Rt' and the center of the circumference Rt are coincident with the center of the regular hexagonal structure of radius R.

It is preferred a parallelepiped-shaped hexagonal system without walls assembled with pipes, profiles or plates located at the edges so as not to have side walls to prevent air from entering or exiting when necessary.

The pipes, profiles or plates which form the parallelepiped shaped regular hexagonal structure of radius R, may be of metal or any other material that supports the needs of the product depending on its size.

Among the preferred materials are metals, plastics, wood or any material used in construction and combinations thereof.

These same materials may be used in combination for the construction of the rotor and the articulated deflector vanes.

The rotor of the vertical axis hydraulic turbine with flow control comprises a hollow rotor with more than three vanes wherein the vanes are shaped like a shark fin and have an axis of large size compared with vanes thereof, hollow rotors with six vanes may be used which generate an equal number of independent and distinct areas associated with each other where the vanes that comprise the same consist of vertical plates of a laminar configuration oriented in the same direction of rotation of the rotor to use the incident fluid in either direction.

The shark fin-shaped vanes of the rotor comprise a triangular shape where the sides of the triangle not attached to the rotor have convex and concave curves respectively, so that water drives the rotor on the concave side of the vane and the excess of fluid passes over the convex area impacting on the concave region of the next vane (see FIG. 5').

If necessary and in accordance with the fluid flow present at the installation site of the hydraulic turbine, the rotor axis can be increased so as to include a greater number of vanes for improved flow control.

In accordance with the theorem of Helmholtz it is preferable to use hollow rotors to avoid loss of kinetic energy of the impinging fluid in the hydraulic turbine of the invention.

In order to modify the opening or closing of the moveable part of each articulated deflector vane, the hydraulic turbine described herein has electrical isolated, mechanical, hydraulic or pneumatic means allowing the closure of the movable portion thereof to be used in case of strong liquid streams that may damage the structure.

Such electrical isolated, mechanical, hydraulic or pneumatic means allow the closure of the moveable part and can be actuated automatically when fluid flow exceeds a certain speed which is detected by a speed meter to determine the flow rate included in structure.

To protect the integrity of the vertical axis hydraulic turbine with flow control, the same has a lifting and lowering means so that it can be raised above the level of the liquid in case the stream is at a speed that may damage the hydraulic turbine.

The system can be shutdown in a very short time, whereby the same may be lifted above the liquid level rapidly.

In this case, the hydraulic energy, actually the kinetic energy of the moving fluid, provides mechanical energy to the rotor which, through a mechanical drive system rotates the rotor of a generator, usually a three phase alternator, which converts rotational mechanical energy into electrical energy.

The hydraulic generator described herein presents some technical features that can be designed to take advantage of the flow of liquid from any direction, when installed in the current of a river or the ocean, to produce energy, particularly electricity, being its installation and configuration simple, ideal for use in all sizes.

The rotor vanes have a laminar configuration in a vertical position and a curved profile in a plan view similar to a shark fin, being said curved profile oriented in the same direction of rotation to use the liquid incident in any direction caused by the articulated deflector vane.

This hydraulic generator has the advantage that it is not necessary to position it so that the central rotary axis is aligned with the incident direction of the liquid, but any direction of the incident liquid moves the shark fin type vanes of the rotor as any incident liquid is taken by the movable part of the articulated deflector vanes.

To prevent deterioration of the machine in case of very heavy liquid streams it is provided that said device has a mechanism through which the moving vanes are closed so as to form a circumference with no surfaces exposed to liquid currents.

Several vertical axis turbines with flow control can be built in the form of modules that can be stacked on a floating island-like structure or adjacent within the bed of a river or the ocean.

Stacked modules may share the same axis of the rotors, when installed for examples on artificial islands, and an additional advantage in this case is that if the hexagonal structures are regularly offset this configuration may receive the fluid current enhancing its performance.

Preferably a tower-shaped structure supports a hexagonal housing; said tower only acts to keep the turbine suspended and prevents damage to the rotor vanes. Preferably the tower may be mounted on a mechanism capable of changing of direction to optimize power and to adapt to a Tidal current. The tower structure allows that different depths of the tide are achieved by the hydraulic turbine, so that energy capture maximizes the output power. The design is adapted to meet the requirements of different rivers or seas wherein a hydraulic turbine is installed.

For example it could be high and fine when installed at a depth of navigation in an estuary of a river, or low and wide when installed in the shallow area of a river that is not navigable. The means for generating energy are above and below the water tower so as to be easily accessible for maintenance and service. Considering the energy generating means are above the water, the system presents a low risk for navigation.

The tower can be mounted on the bed of the river or the ocean through concrete blocks either in shallow rivers or estuaries or through mono pile or tripod structure in deep water.

Preferably the tower may form one of the legs of a quay or a pontoon anchored or alternatively is hung in depth from a floating platform.

The tower preferably has a symmetric design and operates bidirectionally allowing the capture of power in both directions (up and down on the tide) when located in a Tidal flow.

The hydraulic turbine herein described may be supported by an anchored floating platform which can vary the equipment depth to appropriate currents.

In a preferred embodiment, in the hydraulic turbine of the invention, the generator is out of the water so as to have advantages as regards insulation and maintenance.

It is preferred in the hydraulic turbine according to this disclosure that the rotor is hollow to prevent loss of the kinetic energy of the fluid impinging on it.

In the center of a vortex there are only parasitic forces on the moving fluids, either gases or liquids; a consequence of the theorem of Helmholtz reads "in an ideal fluid at the center of the swirl there is no loss of energy; consequently this energy cannot be delivered to be used". It follows that the use of a hollow rotor proves to be more convenient for the hydraulic turbine described.

Similarly in case of water or liquids more viscous than air wherein few revolutions are generated, rotors with many plates are preferred.

It is preferred to use rotors of more than 3 vanes such as 6 vanes, vanes 10 or vanes 12.

Differences and Advantages Over Vertical Axis Hydraulic Systems

The associated movable and fixed vanes of this equipment can capture a several times greater mass of liquid and transmit its energy by increasing its speed impacting directly on the rotor vanes.

By homogenizing the fluid stream, the pressure exerted on the vanes is more uniform avoiding stresses and vibration with loss of useful power and facilitating and simplifying its construction design.

It allows regulating the start speed similar to a SAVONIUS system and by increasing the opening of the moving vanes speed and overall performance increases over a Darrieus system as it operates on resistance force and high speed, combining the advantages of traditional vertical axis hydraulic systems.

Summarizing, this is a direct drive hydraulic turbine, which advantages are:

Maximum use of water power as it transmits the vector by increasing the liquid velocity impacting on the rotor vanes directly.

Increase due to narrowing of the fluid outlet from at the end of the fixed portion closest to the rotor of each of the articulated deflector vanes.

General Advantages Over Horizontal Axis Hydraulic Equipment

Support on two or more sites of the rotor with the structure avoiding vibrations and fatigue of material.

Little or minimal vibration.

Stacked modular use.

Unique rotor with offset vanes for an easier start and to avoid vibrations and parasitic frequencies.

Generator that can be lifted over the level of liquid with obvious maintenance advantages. No risk of operators working underwater and at lower cost.

Lubrication equipment (tanks, pumps, filters, etc.).

Overall modular construction system in factory, allows a quick and secure assembly in permanent hydraulic currents either in rivers or open sea, etc., and difficult access areas.

Use of conventional materials (resins and stainless steel only).

Solid and robust construction with little sound and visual impact.

Safe, as rotor vanes cannot detach as they are installed within the equipment protected by the fixed vanes, allowing use in oceans and rivers.

It is the only equipment that can be designed in different heights and vane length according to the hydraulic currents present at the installation site.

Being a structure with hexagonal base, the width of the vane plus the fixed vane width equals the width of the movable vane, being able to choose these parameters according to the best hydrodynamics.

Suitable for marine and river use on platforms, ships, buoys, etc.

Multidirectional, fully automatic, using hydraulic resources even in turbulences.

Simple braking system without wear or rubbing, simply closing the moving vanes (see the top view of the closure system).

Upon a weather alert, the system can be closed completely and shuts down; restart is immediate.

The half-life and low cost of construction and maintenance far exceeds any hydraulic equipment today, allowing its use in financial plans associated to its operation, by issuing green and/or energy bonds.

Allows affordable insurance.

The invention claimed is:

1. A vertical axis wind and hydraulic turbine with flow control comprising:
    a regular hexagonal structure (7), the regular hexagonal structure having a first radius (R), and a parallelepiped shape;
    a rotor (6) located inside the regular hexagonal structure (7), the rotor having a wind or liquid inlet, a wind or liquid outlet, and three or more rotor vanes that, in top view, rotate on a vertical rotor axis which is located in a center of the regular hexagon structure,
    wherein said three or more rotor vanes rotate to generate a circle of a second radius (Rt) and a flow of air or liquid enters the rotor vanes through the wind or liquid inlet on a wind or liquid current entry side and then exits from the rotor vanes on a side opposite to the wind or liquid entry side; and
    exactly six articulated deflector vanes, wherein the six articulated deflector vanes i) grab and concentrate the flow of air or liquid entering the rotor vanes, from the wind or liquid current entry side and ii) diffuse the flow of air or liquid exiting from the rotor vanes, on the side opposite to the wind or liquid entry side, wherein,
    each one of the six articulated deflector vanes comprises a fixed part (3) and a movable part (2) movable between a closed position and an open position,
    each of said fixed parts (3) has a first inner end located adjacent the circle of a second radius (Rt) generated by the rotation of the three or more rotor vanes of the rotor (6), the first inner end of each of said fixed parts (3) having a curved surface that extends along a circle of a third radius (Rt'), the circle of a third radius (Rt') being located adjacent the circle of a second radius (Rt),
    each said fixed part (3) has a second outer end located adjacent a vertex of the regular hexagonal structure (7) located on the circle of a first radius (R) of the regular hexagonal structure (7), the second outer end of each said fixed part (3) having a curved end surface with a fourth radius (r'),
    each of said movable parts (2) has a first inner end pivotally mounted on a pivot axis located at one of the vertices of the regular hexagonal structure (7) and parallel to the rotor axis, the first inner end of each said movable part (2) having a leading edge (10) defined by a convex semicircle having a radius of curvature (r)

corresponding to the fourth radius (r') of the curved end surface of the second outer end of each said fixed part (3), in the open position of each said movable part (2), the leading edge (10) of each said movable part (2) extends along and adjacent the curved end surface of the second outer end of a corresponding one of said fixed parts (2), and each of said movable parts (2) has a second outer end that defines a trailing edge (9) of each articulated deflector vane and a mean curvature line (LCM) that extends from the first inner end, through the pivot axis, to the trailing edge (9).

2. The wind and hydraulic turbine according to claim 1, wherein each of the six articulated deflector vanes comprise vertical plates of laminar configuration oriented in a direction of rotation of the rotor to use the wind or fluid flow incident from any direction.

3. The wind and hydraulic turbine according to claim 2, wherein each movable part of each of the six articulated deflector vanes located on the pivot axes parallel to the rotor axis which are on each of the six vertices of the hexagonal regular structure, rotates about the corresponding pivot axis so as to i) close the wind or liquid inlet to the rotor between a first said articulated deflector vane and an adjacent, second said articulated deflector vane, when said articulated deflector vanes are on the wind or liquid entry side and ii) to close the wind or liquid outlet from the rotor between said articulated deflector vane and the adjacent, second articulated deflector vane, when said articulated deflector vanes are opposite to the wind or liquid entry side.

4. The wind and hydraulic turbine according to claim 3, wherein when the movable parts of each of the six articulated deflector vanes are in the closed position, the mean curvature line of the moving parts of each of the six articulated deflector vanes generates a circle of the first radius (R), when viewed from above the six articulated deflector vanes.

5. The wind and hydraulic turbine according to claim 1, wherein the mean curvature line of the moveable part of each articulated deflector vane is equal to ⅙ of a circle of the first radius (R).

6. The wind and hydraulic turbine according to claim 1, wherein the mean curvature line of the movable portion of each articulated deflector vane equals an arc passing through the middle of the fixed part of each articulated deflector vane and extends into the center of the regular hexagonal structure of the first radius (R).

7. The wind and hydraulic turbine according to claim 1, wherein,
the movable part of the articulated deflector vanes has a profile aerodynamically in a shape of an aircraft wing,
each said movable part has a profile with a top surface with a convex area and a lower surface with a concave region, and
the convex area is joined to the concave area through the leading edge (10) at a widest part of the profile and forming an acute angle at a less wide portion of the profile, which corresponds to the outer end of the moveable part.

8. The wind and hydraulic turbine according to claim 7, wherein the fixed part of the articulated deflector vanes has an upper zone and a lower zone and a curvature with a profile that continues the convex area of the top surface of the movable part at the upper zone and continues the concave area of the lower surface of the moveable part at the lower zone, wherein at the first inner end of the fixed part the curvature changes course and direction to attain a higher performance as the fluid enters tangentially to a circumference of a radius generated by the rotation of the rotor vanes, wherein the convex area joins with the concave area of the side of the moveable part by the leading edge (10) with the concave semicircle of the radius of curvature (r) where the fourth radius (r') is greater than the radius of curvature (r), and wherein the upper zone joins with the lower zone of the fixed part at the first inner end through the curved surface that extends along the circle of a third radius (Rt'), the circle of a third radius (Rt') being greater than the circle of a second radius (Rt), generated by the rotation of the three or more rotor vanes.

9. The wind and hydraulic turbine according to claim 1, wherein the turbine is configured to operate in a wind mode and said three or more rotor vanes generate three independent and distinct areas associated with each other when the turbine operates in the wind mode.

10. The wind and hydraulic turbine according to claim 1, wherein the turbine is configured to operate in an hydraulic mode and the rotor has six or more rotor vanes.

11. The wind and hydraulic turbine according to claim 10, wherein the rotor has ten or more rotor vanes.

12. The wind and hydraulic turbine according to claim 10, wherein the rotor has twelve or more rotor vanes.

13. The wind and hydraulic turbine according to claim 10, wherein the rotor is hollow.

14. The wind and hydraulic turbine according to claim 13, wherein the turbine has an hydraulic mode and the rotor vanes are shark fin vanes.

15. The wind and hydraulic turbine according to claim 1, wherein each rotor vane of said rotor comprises a vertical plate of laminar configuration oriented in a same direction of rotation of the rotor to use the wind or liquid incident in any direction.

16. The wind and hydraulic turbine according to claim 1, further comprising means for lifting and lowering the structure so that the wind and hydraulic turbine can be hidden underground in case of hurricanes and tornadoes.

17. The wind and hydraulic turbine according to claim 1, wherein the regular hexagonal structure is constructed with one of the group consisting of pipes, profiles and plates.

18. The wind and hydraulic turbine according to claim 17, wherein the one of the group consisting of pipes, profiles and plates is comprised of at least one of the group consisting of metal, plastic, and wood.

19. The wind turbine according to claim 1, wherein the rotor vanes and articulated deflector vanes are comprised of at least one of the group consisting of metal, wood and plastic material.

20. The wind and hydraulic turbine according to claim 1, further comprising a generator.

21. The wind and hydraulic turbine according to claim 1, further comprising an antiseismic module which allows coupling the vertical axis turbine to the ground or between more than one vertical axis wind turbine stacked one above the other.

22. The wind and hydraulic turbine according to claim 21, wherein said antiseismic module comprises two rings linked by six elastic shock absorbers each comprising a housing and a piston.

* * * * *